(12) United States Patent
Shivakumar et al.

(10) Patent No.: US 10,475,164 B2
(45) Date of Patent: Nov. 12, 2019

(54) ARTIFACT DETECTION IN A CONTRAST ENHANCED OUTPUT IMAGE

(71) Applicant: QUALCOMM Incorporated, San Diego, CA (US)

(72) Inventors: Shreyas Hampali Shivakumar, Bangalore (IN); Ajit Venkat Rao, Bangalore (IN); Yogesh Gupta, Bangalore (IN); Conrad A. Harrison, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 15/702,394

(22) Filed: Sep. 12, 2017

(65) Prior Publication Data
US 2019/0080437 A1    Mar. 14, 2019

(51) Int. Cl.
| | | |
|---|---|---|
| *G06T 5/00* | (2006.01) |
| *G06T 7/11* | (2017.01) |
| *G06T 5/20* | (2006.01) |
| *H04N 1/40* | (2006.01) |
| *H04N 1/407* | (2006.01) |
| *H04N 1/409* | (2006.01) |
| *G06T 7/90* | (2017.01) |

(52) U.S. Cl.
CPC ............ *G06T 5/002* (2013.01); *G06T 5/20* (2013.01); *G06T 7/11* (2017.01); *G06T 7/90* (2017.01); *G06T 2207/20012* (2013.01)

(58) Field of Classification Search
CPC .......... G06T 2207/20021; G06T 5/002; G06T 7/0012; G06T 7/11
USPC ....... 382/209, 224, 260, 274, 275, 278, 309; 358/3.26, 3.27, 537, 463
See application file for complete search history.

(56) References Cited

U.S. PATENT DOCUMENTS

| | | | | |
|---|---|---|---|---|
| 7,305,111 B2* | 12/2007 | Arimura | ............... | G06T 7/0012 |
| | | | | 382/131 |
| 7,496,619 B2* | 2/2009 | Aldroubi | ................. | G06T 5/001 |
| | | | | 708/446 |
| 7,599,572 B2* | 10/2009 | Shekter | ..................... | G06K 9/40 |
| | | | | 358/463 |
| 7,602,938 B2* | 10/2009 | Prokoski | ................. | F42B 35/00 |
| | | | | 382/100 |
| 7,805,011 B2* | 9/2010 | Klamer | ................ | G11B 27/329 |
| | | | | 382/190 |
| 8,116,585 B2* | 2/2012 | Wu | ..................... | G03G 15/5062 |
| | | | | 382/260 |
| 8,164,039 B2* | 4/2012 | Bovik | .................. | G06K 9/4633 |
| | | | | 250/208.1 |

(Continued)

*Primary Examiner* — Yosef Kassa
(74) *Attorney, Agent, or Firm* — Shumaker & Sieffert, P.A.

(57) ABSTRACT

One or more processors may perform one or more lookup table (LUT)-based image processing operations on an input image to produce an output image, wherein performing the one or more image processing operations on the input image introduces one or more banding artifacts in the output image. The one or more processors may determine one or more sub-regions of the output image that include the one or more banding artifacts. The one or more processors may perform one or more artifact reduction operations on the one or more sub-regions of the output image without performing the one or more artifact reduction operations on remaining sub-regions of the output image.

29 Claims, 8 Drawing Sheets

(56) References Cited

U.S. PATENT DOCUMENTS

| | | | | |
|---|---|---|---|---|
| 8,451,504 B2* | 5/2013 | Xu | ................ | G06K 9/036 |
| | | | | 358/3.26 |
| 8,509,565 B2* | 8/2013 | Chen | ................ | G02B 21/008 |
| | | | | 382/128 |
| 8,520,920 B2* | 8/2013 | Guehring | ............ | A61B 6/5258 |
| | | | | 382/128 |
| 8,532,428 B2* | 9/2013 | Inoue | ................ | G06T 5/002 |
| | | | | 382/254 |
| 8,600,184 B2 | 12/2013 | Guo et al. | | |
| 9,185,270 B2 | 11/2015 | Bienvenu et al. | | |
| 9,639,920 B2 | 5/2017 | Dai et al. | | |
| 2004/0252759 A1 | 12/2004 | John Winder et al. | | |
| 2010/0046804 A1 | 2/2010 | Gu et al. | | |

* cited by examiner

| INPUT PIXEL VALUES | OUTPUT PIXEL VALUES |
|---|---|
| 0 | 0 |
| 1 | 1 |
| ... | ... |
| 124 | 108 |
| 125 | 109 |
| 126 | 110 |
| 127 | 112 |
| 128 | 113 |
| 129 | 114 |
| 130 | 116 |
| ... | ... |
| 255 | 255 |

US 10,475,164 B2

ARTIFACT DETECTION IN A CONTRAST ENHANCED OUTPUT IMAGE

TECHNICAL FIELD

This disclosure relates to image and/or video processing.

BACKGROUND

An image processing pipeline may receive an input image, perform one or more images processing operations thereon, and generate an output image. The image processing operations may cause the output image to include artifacts, such as banding artifacts. Banding artifacts may be described, in some examples, as an abrupt and unnatural change in color gradient in an image. Various image processing operations may cause an image to include artifacts. For example, contrast enhancement (CE) is an example of an image processing technique that commonly causes banding artifacts. Contrast enhancement widens/stretches the histogram of color values of the input image, resulting in increased color gradients in the output image relative to the input image.

SUMMARY

This disclosure describes techniques for image and/or video processing, and more specifically to techniques for identifying one or more sub-regions of an image that includes one or more artifacts. Identifying specific sub-regions of an image that includes one or more artifacts may enable those one or more artifacts to be reduced or removed on a localized basis without decreasing the image quality of sub-regions of the image in which artifacts have not been identified.

In one aspect, the disclosure is directed to a method. The method may include performing, by at least one processor, one or more lookup table (LUT)-based image processing operations on an input image to produce an output image, wherein performing the one or more image processing operations on the input image introduces one or more banding artifacts in the output image. The method may further include determining, by the at least one processor, one or more sub-regions of the output image that include the one or more banding artifacts. The method may further include performing, by the at least one processor, one or more artifact reduction operations on the one or more sub-regions of output image without performing the one or more artifact reduction operations on remaining sub-portions of the output image.

In another aspect, the disclosure is directed to a computing device. The computing device may include a memory configured to store an input image. The computing device may further include at least one processor configured to: perform one or more lookup table (LUT)-based image processing operations on the input image to produce an output image, wherein performing the one or more image processing operations on the input image introduces one or more banding artifacts in the output image; determine one or more sub-regions of the output image that include the one or more banding artifacts; and perform one or more artifact reduction operations on the one or more sub-regions of output image without performing the one or more artifact reduction operations on remaining sub-portions of the output image.

In another aspect, the disclosure is directed to an apparatus. The apparatus may include means for performing one or more lookup table (LUT)-based image processing operations on an input image to produce an output image, wherein performing the one or more image processing operations on the input image introduces one or more banding artifacts in the output image. The apparatus may further include means for determining one or more sub-regions of the output image that include the one or more banding artifacts. The apparatus may further include means for performing one or more artifact reduction operations on the one or more sub-regions of output image without performing the one or more artifact reduction operations on remaining sub-portions of the output image.

In another aspect, the disclosure is directed to a computer-readable storage medium storing instructions that, when executed, cause at least one processor to: perform one or more lookup table (LUT)-based image processing operations on an input image to produce an output image, wherein performing the one or more image processing operations on the input image introduces one or more banding artifacts in the output image; determine one or more sub-regions of the output image that include the one or more banding artifacts; and perform one or more artifact reduction operations on the one or more sub-regions of output image without performing the one or more artifact reduction operations on remaining sub-portions of the output image.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
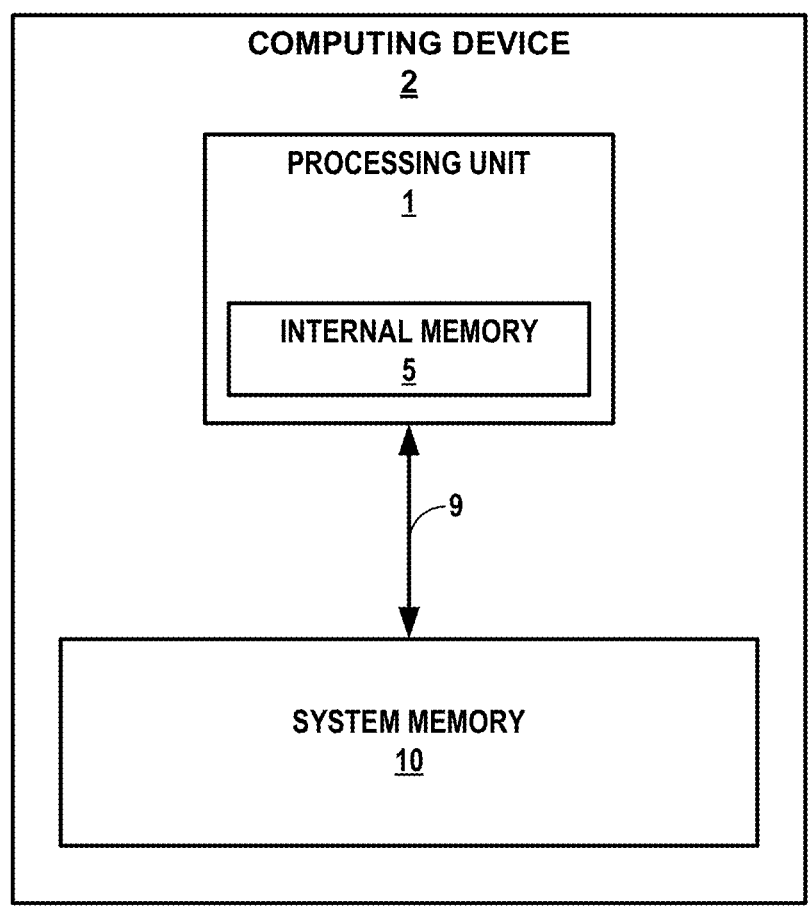
FIG. 1 is a block diagram illustrating an example computing device that may be configured to implement one or more aspects of this disclosure.

In general, the techniques of this disclosure are directed to techniques for determining the presence of artifacts in an output image resulting from performing image processing on an input image. In particular, the techniques of this disclosure may include techniques for determining the presence of banding artifacts (sometimes also referred to as contour artifacts, false contouring, or posterization artifacts) in a look up table (LUT)-based contrast enhanced output image.

For example, the techniques of this disclosure are directed to determining one or more locations in a look up table (LUT)-based contrast enhanced output image that include at least one artifact (e.g., pixel data corresponding to an artifact). A location in the output image may correspond to a sub-region of the output image, where the sub-region encompasses less than the entirety of the output image. A sub-region may include, for example, a slice, a block, or any other sub-region of the output image that encompasses less than the entire visible area of the output image.

As a result of applying one or more techniques described herein, the quality of an output image may be increased and/or image processing resources may be reduced. For example, artifact removal/reduction image processing techniques may be performed on specific locations (e.g., sub-regions) of an image that have been identified as possibly containing artifacts, thereby resulting in less processing being performed, because artifact removal/reduction image processing techniques may not be performed on locations (e.g., sub-regions) of an image that have not been identified as possibly containing artifacts. In such an example, rather than performing an artifact removal/reduction image processing technique on all pixel values of an image, the artifact removal/reduction image processing technique may be performed on less than all pixel values of the image (e.g., a sub-region of the image).

Dithering is one example of an image processing technique that may be used to remove or reduce artifacts, such as banding artifacts, in an output image. Dithering introduces noise into the output image that includes artifacts to break the pixel structures that cause the artifacts. In current systems, the dithering strength parameter is pre-determined and does not depend on the amount of artifacts in the output image that need to be suppressed. Further, in current systems, dithering is performed at all pixel regions in an image irrespective of the location of artifacts, which results in unnecessary quality degradation of the image. For example, dithering sub-regions that do not contain any artifacts may result in the unnecessary introduction of noise to artifact-free regions.

The techniques of this disclosure include determining (e.g., estimating) the amount of artifacts in an output image, determining (e.g., identifying) one or more locations (e.g., sub-regions) of an output image that include one or more artifacts, and quantifying the amount of artifacts in each of the one or more locations of the output image. The amount of artifacts in a sub-region of the output image or of the output image itself may correspond to how visible the artifact is within the sub-region or the image, respectively the number of discrete artifacts, the number of pixels in the sub-region or image affected by the artifacts, and the like. By determining the amount and locations of artifacts, the techniques of this disclosure enable the targeting of one or more artifact removal/reduction image processing techniques in the output image. For example, rather than dither an entire image, the techniques described herein enable dithering only the locations or sub-regions of the output image that include artifacts. As another example, the techniques described herein enable selecting a dithering strength parameter for each sub-region of the output image based on the amount of artifacts in each respective sub-region.

Another way to reduce or remove artifacts in an output image is to reduce the amount of contrast enhancement applied to an image. Similar to the dithering technique, this technique for reducing or removing artifacts may be a tradeoff between the amount of contrast enhancement at the output image and the amount of artifacts introduced. The information about the location(s) and amount of artifacts in a contrast enhanced output image can be utilized to selectively control the contrast enhancement in the processing of subsequent input images thus leading to an optimal tradeoff between contrast enhancement and artifacts.

As used herein, the term "image processing" means "image and/or video processing." Image processing may be understood as transforming an input image into an output image using one or more image processing techniques. Some examples of image processing include forward gamma correction (GC), inverse gamma correction, gamma correction, contrast enhancement, contrast correction, color correction, color transform, tone mapping, inverse tone mapping, any image processing technique, or any combinations thereof.

The techniques described herein, when applied to video frames or still images, may reduce, remove, and/or prevent one or more contour artifacts when processing one or more images and/or video frames. The techniques described herein, when applied to an image and/or video frame, may reduce, remove, and/or prevent one or more contour artifacts when processing the image. A single image or one or more images of a video may be processed in one or more sub-parts, such as one or more tiles or blocks of an image. These sub-parts of an image are herein referred to as sub-regions of an image. The image processing described herein may be performed using any color format. Accordingly, while RGB or any other color format may be specifically identified, this disclosure is not limited to only the specifically referenced color formats.

As used herein, the term "image" may refer to a single image, one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, one or more graphics primitives, image data, graphical data, and the like. In this regard, as described herein, applying the techniques described herein to an image may refer to applying the techniques described herein to a single image, one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, one or more graphics primitives, image data, graphical data, and the like. A sub-part of an image may refer to one or more tiles, blocks, lines, or other smaller part or combination of parts lesser than the whole image. As used herein, a video may be a plurality of images that may be presented in a sequence.

As used herein, the term "image processing" may refer more broadly to "pixel processing" meaning that the techniques described herein with respect to image processing may equally apply to pixel processing. For example, while "image processing" and "pixel processing" may be used interchangeably depending on the context, the techniques described herein may be used for processing pixels in examples where such terms may not be used interchangeably. For example, the techniques described herein may apply to the processing of one or more pixels even when the one or more pixels are disassociated from an image.

FIG. 1 is a block diagram illustrating an example processing unit that may be configured to implement one or more aspects of this disclosure. As shown in FIG. 1, computing device 2 may include processing unit 1 and system memory 10. Processing unit 1 may include internal memory 5. Memory external to processing unit 1, such as depicted system memory 10, may be accessible to processing unit 1. For example, processing unit 1 may be communicatively coupled to system memory 10 over a bus. In some examples, processing unit 1 may be directly communicatively coupled to system memory 10 via a communication medium such as bus 9. In other examples, processing unit 1 may be indirectly communicatively coupled to system memory 10 via a communication medium such as a bus. For example, processing unit 1 may be communicatively directly coupled to another component (e.g., a different processing unit) which is directly communicatively coupled to system memory 10 via a communication medium such as a bus.

Internal memory 5 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

System memory 10 may be a non-transitory storage medium according to some examples. The term "non-transitory" may indicate that the storage medium is not embodied in a carrier wave or a propagated signal. However, the term "non-transitory" should not be interpreted to mean that system memory 10 is non-movable or that its contents are static. As one example, system memory 10 may be removed from computing device 2, and moved to another device. As another example, memory, substantially similar to system memory 10, may be inserted into computing device 2. In certain examples, a non-transitory storage medium may store data that can, over time, change (e.g., in RAM).

Processing unit 1 may be a central processing unit (CPU), a graphics processing unit (GPU), a display processing unit, a digital signal processing unit (DSP), a pixel processing unit, or any other processing unit. Processing unit 1 be integrated into a motherboard of a computing device. In some examples, processing unit 1 may be may be present on a graphics card that is installed in a port in a motherboard of a computing device, or may be otherwise incorporated within a peripheral device configured to interoperate with a computing device. In some examples, processing unit 1 may be on-chip with a CPU, such as in a system on chip (SOC). Processing unit 1 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. Processing unit 1 may also include one or more processor cores, so that processing unit 1 may be referred to as a multi-core processor. In some examples, processing unit 1 may be specialized hardware that includes integrated and/or discrete logic circuitry that provides processing unit 1 with massive parallel processing capabilities suitable for graphics processing. Throughout this disclosure, processing unit 1 may be generally referred to as "one or more processors" or "at least one processor."

For example, while FIG. 1 is discussed in more detail below, processing unit 1 may be CPU 6, GPU 12, digital signal processor (DSP) 11, display processor 14, video codec 7 or another component (whether depicted or not) of computing device 2 depicted in FIG. 11. As another example, processing unit 1 may be any processing unit that is configured to perform image processing or any pixel processing. As another example, processing unit 1 may be any processing unit configured to use a Look Up Table (LUT) to perform image processing or any pixel processing.

In some examples, processing unit 1 may be configured to receive, transmit, and/or generate data (e.g., an image as defined herein) on which one or more image processing techniques described herein may be performed. For example, processing unit 1 may be configured to receive data on which one or more image processing techniques described herein may be performed from another processing unit (e.g., another processing unit 1) or any other source (e.g., any other processing unit or a storage medium such as system memory 10, internal memory 5, or any other memory space). As another example, processing unit 1 may be a GPU (e.g., GPU 12) that is configured to receive, transmit, and/or generate data on which one or more image processing techniques described herein may be performed. Such data may include graphical data received from, for example, a CPU (e.g., CPU 6) or any other source, and/or graphical data transmitted to, for example, a display processor (e.g., display processor 14). In other examples, processing unit 1 may be a display processing unit (e.g., display processor 14) that is configured to receive, transmit, and/or generate data on which one or more image processing techniques described herein may be performed. Such data may include graphical data received from, for example, a CPU (e.g., CPU 6), a GPU (e.g., GPU 12), or any other source. In other examples, processing unit 1 may be a CPU (e.g., CPU 6) that is configured to receive, transmit, and/or generate data on which one or more image processing techniques described herein may be performed. Such data may include graphical data received from, for example, another CPU, a GPU (e.g., GPU 12), or any other source. In other examples, processing unit 1 may be a digital signal processor (e.g., DSP 11) that is configured to receive, transmit, and/or generate data on which one which or more image processing techniques described herein may be performed. In other examples, processing unit 1 may be one or more pixel streaming processors that are configured to receive, transmit, and/or generate data on which one which or more image processing techniques described herein may be performed.

One or more techniques described herein may be implemented in hardware, software, firmware, or any combination thereof. For example, where one or more techniques described herein are implemented in hardware, processing unit 1 may be such hardware or one piece of a plurality of hardware components configured to operate together to perform one or more techniques described herein. In such examples, the hardware may or may not be configured to execute software or firmware that may perform one or more techniques described herein when executed. Any software and/or firmware may be stored on a non-transitory storage medium, such on-chip memory of hardware (e.g., internal memory 5 of processing unit 1) or on external memory to any hardware (e.g., system memory 10).

Processing unit 1 may be configured to use one or more look up tables (LUTs) as part of performing one or more image processing operations on one or more images that are stored in internal memory 5 and/or system memory 10. For example, processing unit 1 may utilize one or more LUTs stored in internal memory 5 and/or system memory 10 to transform an input image into an output image via use of the input-to-output mapping of the LUT. The input-to-output mapping of the LUT may be referred to as a LUT mapping or a LUT mapping configuration. The LUT mapping may map an n-bit input value (e.g., input pixel value) to an n-bit or an m-bit output value (e.g., output pixel value), where n and m may be any integer and n is different than m. For example, a LUT may map an 8-bit input pixel value to an 8-bit output pixel value. In such an example, the LUT may include 256 LUT input values (e.g., 0-255) corresponding to each possible input pixel value, and the LUT may map each LUT input value to one or more 8-bit LUT output values.

The LUT mapping may correspond to or effectuate forward gamma correction (GC), inverse gamma correction, gamma correction, contrast enhancement, contrast correction, color correction, color transform, tone mapping, inverse tone mapping, any image processing technique, or any combinations thereof. Processing unit 1 may be configured to perform image processing such as forward gamma correction (GC), inverse gamma correction, gamma correction, contrast enhancement, contrast correction, color correction, color transform, tone mapping, inverse tone mapping, any image processing technique, or any combinations thereof. The term "image processing" may thus be understood as transforming an image to an output image.

When performing one or more image processing operations that uses a LUT, the input to the LUT is an input pixel value and the output from the LUT is an output pixel value. An input pixel value may be a pixel value of a pixel of an input image, and an output pixel value may be a pixel value of a pixel in the output image. A LUT may map one or more input pixel values to one or more output pixel values.

An image may comprise a plurality of pixels that form the image. Each of the plurality of pixels may have a pixel value. A pixel value may, for a corresponding pixel, describe the pixel's color, the pixel's brightness, the pixel's transparency, and the like. The pixel value may be described or represented using any number of suitable color models, such as RGB, CMYK, HSV, HSL, HSB, Lab, and the like. A pixel value may also be referred to as a pixel color value, a color value, a pixel color, and the like.

To perform one or more image processing operations on an input image to transform it into an output image, processing unit 1 may utilize a LUT to map the input pixel values of the pixels of the input image to output pixel values of the pixels of the output image, so that the pixels of the output image are associated with the output pixel values. Such one or more image processing operations that utilizes a LUT to map input pixel values to output pixel values may be referred to as LUT-based image processing.

In accordance with aspects of the present disclosure, processing unit 1 may be configured to perform one or more LUT-based image processing operations on an input image stored in internal memory 5 and/or system memory 10 to produce an output image, wherein performing the one or more image processing techniques on the input image introduces one or more banding artifacts in the output image. Processing unit 1 may further be configured to determine one or more sub-regions of the output image that include the one or more banding artifacts.

Figure 2:
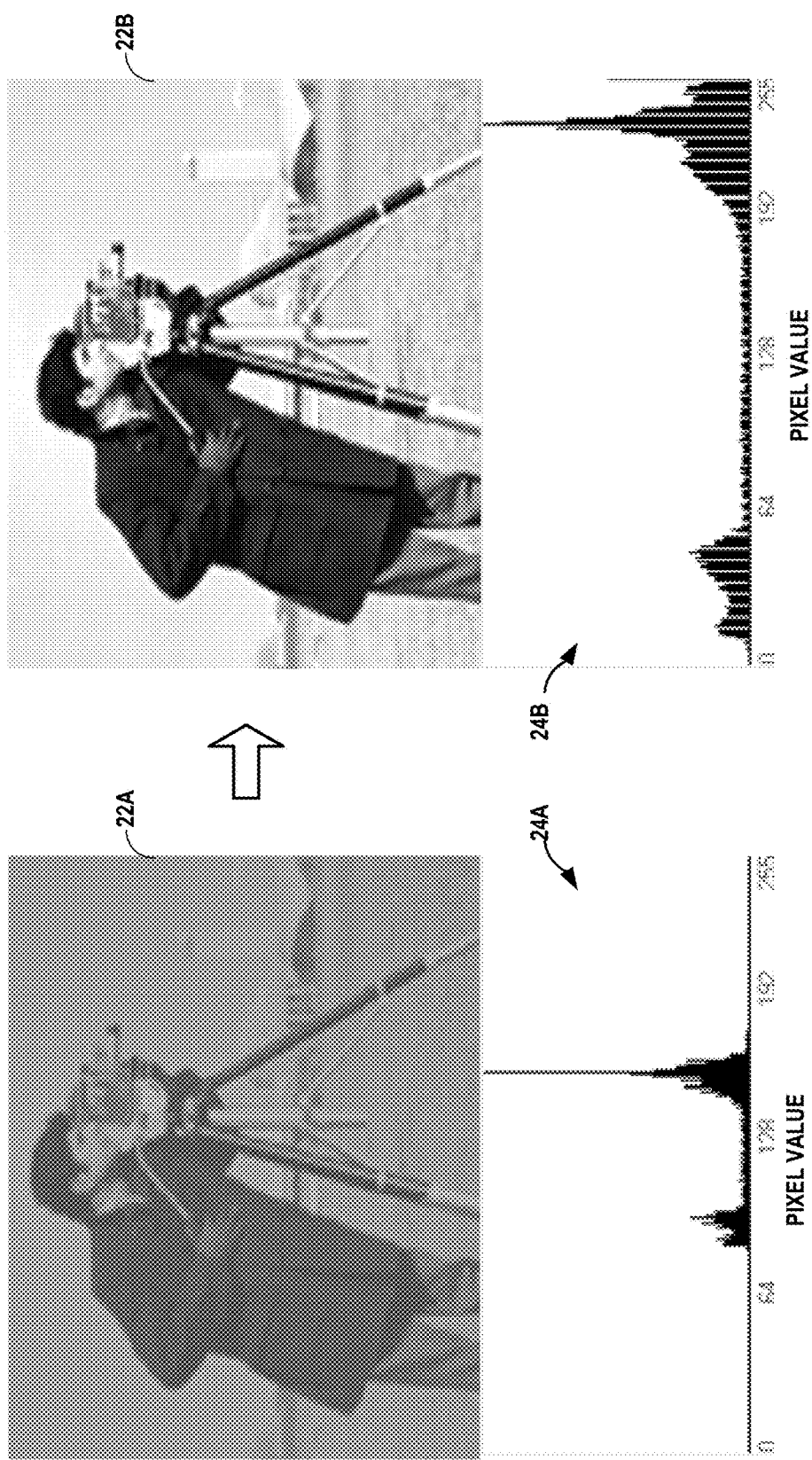
FIG. 2 illustrates an example input image having one or more image processing operations performed thereon to produce an output image

FIG. 2 illustrates an example input image having one or more image processing operations performed thereon to produce an output image. As shown in FIG. 2, processing unit 1 may perform contrast enhancement on input image 22A to produce output image 22B. Contrast enhancement is an example of the one or more image processing operations that processing unit 1 may perform on an image (e.g., input image 22A).

To performing one or more image processing operations, such as contrast enhancement, on input image 22A, processing unit 1 may change the pixel values of the pixels making up input image 22A by mapping those pixel values to the same pixel value or to a different pixel value. Each of the pixels of input image 22A may have one or more pixel values. One or more pixel values may, for a corresponding pixel, describe the pixel's color, the pixel's brightness, and the like. The pixel values may be described or represented using any number of suitable color models, such as RGB, CMYK, HSV, HSL, HSB, Lab, and the like. A pixel value may also be referred to as a pixel color value, a color value, a pixel color, and the like.

A pixel may include one or more color components, and each color component of a pixel may have a corresponding pixel value. As an example, an RGB color formatted pixel includes three pixel values: a Red pixel value, a Green pixel value, and a Blue pixel value. In another example, an HSV color formatted pixel includes three pixel values: a Hue pixel value, a Saturation pixel value, and a Value pixel value. In the HSV color model, the Value pixel value may correspond to a pixel luminous intensity component. In another example, a greyscale pixel may include a single pixel value that indicates the luminous intensity of the pixel.

A pixel value may be defined by one or more bits. The range of values for a pixel value may depend on the number of bits it is defined by. For example, an 8-bit pixel value may have a range from 0 to 255, while a 16-bit pixel value may have a range from 0 to 65,535. In the example of FIG. 2, each of the pixel values may be an 8-bit pixel value having a range from 0 to 255.

In the example of FIG. 2, histograms 24A illustrates the distribution of pixel values within input image 22A, while histograms 24B illustrates the distribution of pixel values within output image 22B. A distribution of pixel values within input image 22A may indicate the number of pixels of input image 22A having each of the pixel values that range, such as from 0 to 255. Similarly, a distribution of pixel values within output image 22B may indicate the number of pixels of output image 22B having with each of the pixel values across the range of pixel values.

To perform the contrast enhancement operations on input image 22A, processing unit 1 may expand or widen the distribution of pixel values of input image 22A so that the pixels of the resulting output image 22B are more widely distributed across the range of available pixel values. In particular, to perform contrast enhancement, processing unit 1 may widen the distribution of pixel values associated with the luminous intensity of the pixels of input image 22A.

As discussed above, a pixel may have one or more pixel values that corresponds with one or more color components of the pixel. In some examples, a color component of a pixel may directly correspond to the luminous intensity of the pixel. For example, an HSV color formatted pixel may have a Value pixel value that corresponds to the pixel luminous intensity component. If the colors of input image 22A are associated with an HSV color model, then the distribution of pixel values of input image 22A illustrated by histogram 24A may be a distribution of the Value pixel values of input image 22A.

In other examples, a pixel may not necessarily have a pixel value that directly correspond to the luminous intensity of the pixel. For example, an RGB color formatted pixel may have a Red pixel value, a Green pixel value, and a Blue pixel value. If the colors of input image 22A are associated with an RGB color model, then the distribution of pixel values of input image 22A illustrated by histogram 24A may be a distribution of one of the Red, Green, or Blue pixel values of input image 22A.

In some examples, processing unit 1 may be able to determine, for a pixel, a pixel value that directly correspond to the luminous intensity of the pixel, regardless of whether the pixel has a pixel value that directly correspond to the luminous intensity of the pixel. For example, given an RGB color formatted pixel, processing unit 1 may generate a pixel value that directly correspond to the luminous intensity of the pixel from the Red, Green, and Blue pixel values of the pixel.

In the example of FIG. 2, the distribution of pixel values illustrated by histograms 24A and 24B may be a distribution of pixel values that directly correspond to the luminous intensity of pixels. Processing unit 1, by performing the contrast enhancement operation on input image 22A to produce output image 22B, may more widely distribute the pixels of output image 22B across the range of available pixel values (e.g., across pixel values ranging from 0 to 255). As can be seen in histogram 24A representing the distribution of pixel values of input image 22A, the pixels of input image 22A are not widely distributed across the range of available pixel values (e.g., across pixel values ranging from 0 to 255). Meanwhile, as can be seen in histogram 24B representing the distribution of pixel values of output image 22B, the pixels of output image 22B are more widely distributed across the range of available pixel values compared with the distribution of pixels of input image 22A as represented by histogram 24A.

By performing contrast enhancement to more widely distribute the pixels of input image 22A across the range of available pixel values to generate output image 22B, processing unit 1 may map each of the pixel values within the available range of pixel values for input image 22A to the same or a different pixel value within the available range of pixel values for output image 22B. For example, each of a set of pixels in input image 22A that have the same color value (e.g., 122) may be mapped to a different color value (e.g., 108), so that a corresponding set of pixels in output image 22B that are at the same pixel locations of output image 22B may have the color value of 108 that is mapped from the color value (e.g., 122) of the corresponding set of pixels in input image 22A.

By performing contrast enhancement to more widely distribute the pixels of input image 22A across the range of available pixel values to generate output image 22B, processing unit 1 may potentially introduce banding artifacts into output image 22B that are not so present in input image 22A. In accordance with aspects of the present disclosure, processing unit 1 may be configured to determine one or more sub-regions of output image 22B that includes one or more banding artifacts.

In general, the pixel values of an image on which processing unit 1 may perform one or more image processing operations may be referred to as input pixel values, and the pixel values of the output image resulting from processing unit 1 performing one or more image processing operations on the image may be referred to as output pixel values. The input and output pixel values may refer to pixel values that indicate the luminous intensity of pixels having such input and/or output pixel values. Processing unit 1 may, as part of performing one or more image processing operations on input image 22A to produce output image 22B, map each input pixel value of the pixels in input image 22A to an output pixel value of the pixels in output image 22B, where each output pixel value may be the same pixel value or a different pixel value.

Figures 3, 4:
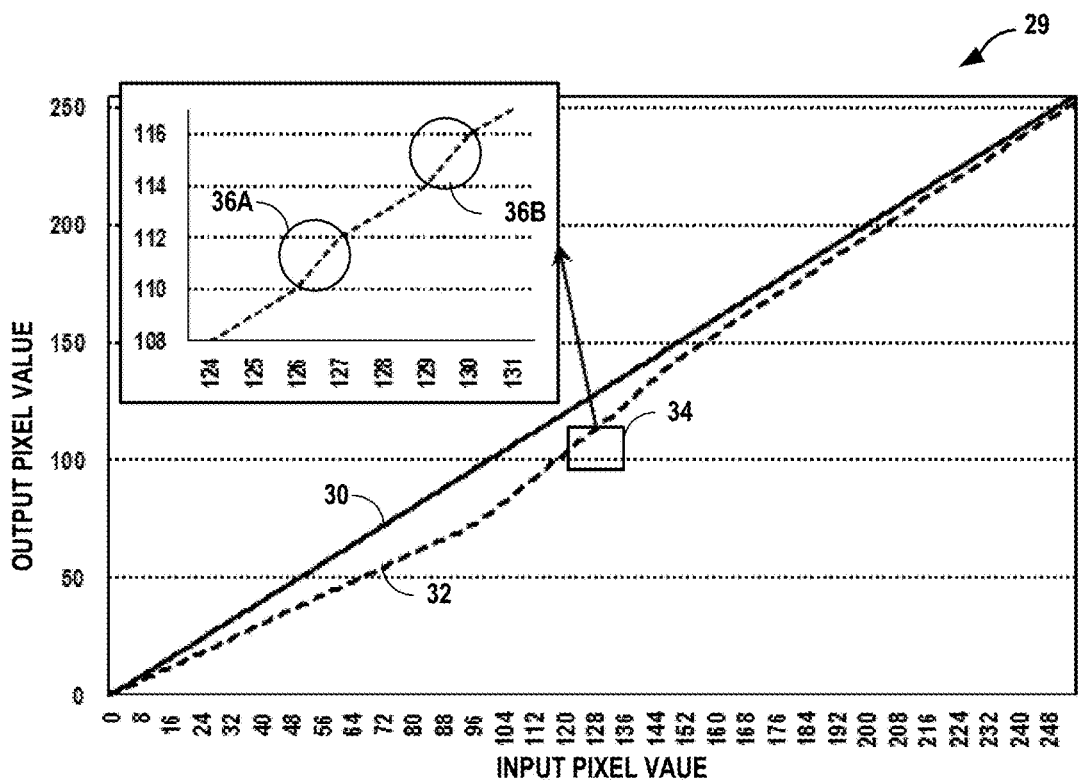
FIG. 3 illustrates a portion of an example lookup table that maps input pixel values to output pixel values.
FIG. 4 is a graphical illustration of an example mapping of input pixel values to output pixel values.

Processing unit 1 may store the mapping of output pixel values to input pixel values in a lookup table (LUT), also referred to in some instances as a colormap. Processing unit 1 may index into the LUT with an index value to determine the corresponding output pixel value. FIG. 3 illustrates a portion of an example lookup table that maps input pixel values to output pixel values. As shown in FIG. 3, lookup table (LUT) 26 may include a set of input pixel values 27 and a set of corresponding output pixel values 28. Processing unit 1 may index into LUT 26 using an input pixel value to look up the corresponding output pixel value. For example, processing unit 1 may index into LUT 26 with an input pixel value of 124 to determine that it has a corresponding output pixel value of 108. In one example, for input pixel value i, processing unit 1 may use LUT 26 to look up the corresponding output pixel value LUT(i).

Processing unit 1 may use LUT 26 to remap the color values of an image in order to perform one or more image processing operations on the image. For example, processing unit 1 may simply remap the color values of the image from input pixel values to their corresponding output pixel values using LUT 26.

Such use of LUT 25 to remap the color values of an image may be useful when performing the same one or more image processing operations on a set of images, such as a set of video frames making up at least a portion of a video. For example, processing unit 1 may, as part of performing one or more image processing operations on a video frame of a video, map a set of input color values to a set of corresponding output color values. This may occur when, such as shown in FIG. 2, when processing unit 1 widens the histogram of pixel values of an input image. Processing unit 1 may build LUT 26 to contain such a mapping of input color values to output color values. For subsequent video frames of the video, processing unit 1 may perform the same one or more image processing operations on the subsequent video frames by simply indexing into LUT 26 with input pixel values to look up corresponding output pixel value to which the input pixel values are mapped.

Thus, when performing LUT-based contrast enhancement operations on a set of images, processing unit 1 may not have to re-determine the mapping of input pixel values to output pixel values for each of the set of images. Instead, once processing unit 1 builds LUT 26 for a first image in the set of images, processing unit 1 may re-use LUT 26 to perform LUT-based contrast enhancement for subsequent images in the set of images.

Performing one or more image processing operations based on an LUT (i.e., LUT-based image processing) may potentially introduce image processing artifacts, such as banding artifacts. Banding artifacts may result from, for example, adjacent table entries in the LUT having gaps in value, which may occur in non-linear mappings. As shown in FIG. 3, LUT 26 may map input pixel values 126 and 127 to output pixel values 110 and 112, respectively. The gap between output pixel values 110 and 112 is an example of an LUT jump because the output pixel values jump by 2 from 110 to 112, while its corresponding input pixel values 126 and 127 differ only by one. In this example, output pixel value 111 will never appear in the output image, so that such a jump in output pixel values from 110 to 112 may potentially result in visible banding artifacts.

The mapping of input pixel values to output pixel values, and gaps between output pixel values can be visualized via graphical illustration. FIG. 4 is a graphical illustration of an example mapping of input pixel values to output pixel values. As shown in FIG. 4, graph 29 is a graphical representation of a LUT, such as LUT 26. The x-axis of graph 29 may represent the range of input pixel values, while the y-axis of graph 29 may represent the range of output pixel values.

Output pixel values 32 are plotted in graph 29 along with a 1:1 slope 30 for comparison. Gaps in output pixel values 32 may occur when an LUT jump occurs. The slope or size of an output pixel value s(i) for a given input pixel value i is defined as $$s(i) = LUT(i+1) - LUT(i) \tag{1}$$

where LUT(i) is the output pixel value for input pixel value i, and LUT(i+1) is the output pixel value for input pixel value i+1.

The slope or size of an output pixel value indicates how much the output pixel value would change if the input pixel value changes by 1. A slope or size for an output pixel value that is greater than 1 indicates that an LUT jump occurs at the output pixel value. Correspondingly, a slope or size for an output pixel value that is greater than 1 also indicates that an LUT jump occurs at the corresponding input pixel value As can be seen in inset 34, there is gap 36A between input pixel values 126 and 127 because input pixel value 126 has a corresponding output pixel value of 110, while input pixel value 127 has a corresponding output pixel value of 112. There is also gap 36B between input pixel values 129 and 130 because input pixel value 129 has a corresponding output pixel value of 114, while input pixel value 130 has a corresponding output pixel value of 116. Therefore, output pixel values 112 and 116 may each be an LUT jump each having a size of 2.

While LUT jumps within a sub-region of an image may indicate that the sub-region may potentially suffer from banding artifacts, such LUT jumps are not dispositive of the sub-region having such banding artifacts. Whether a sub-region of an image suffer from banding artifacts may depend on the distribution of neighborhood pixels of input pixel values associated LUT jumps.

Processing unit 1 may, for a LUT jump, define a set of left neighborhood pixels and a set of right neighborhood pixels. Given an output pixel value LUT(i) associated with a LUT jump, the set of left neighborhood pixels may be a set of output pixel values that correspond to input pixel values that are consecutively less than input value i that corresponds to the output pixel value LUT(i), inclusive of output pixel value LUT(i). Correspondingly, the set of right neighborhood pixels may be a set of output pixel values that correspond to input pixel values that are consecutively greater than input pixel value i that corresponds to output pixel value LUT(i). In one example, the left neighborhood pixels may be the set of output pixel values {LUT(i−2), LUT(i−1), LUT(i)}, while the right neighborhood pixels may be the set of output pixel values {LUT(i+1), LUT(i+2), LUT(i+3)}. In the example of FIG. 2, the LUT jump at output value 110 may have a left neighborhood of pixels comprising output pixel values 108, 109, and 110, and a right neighborhood of pixels comprising output pixel values 112, 113, and 114.

Figure 5:
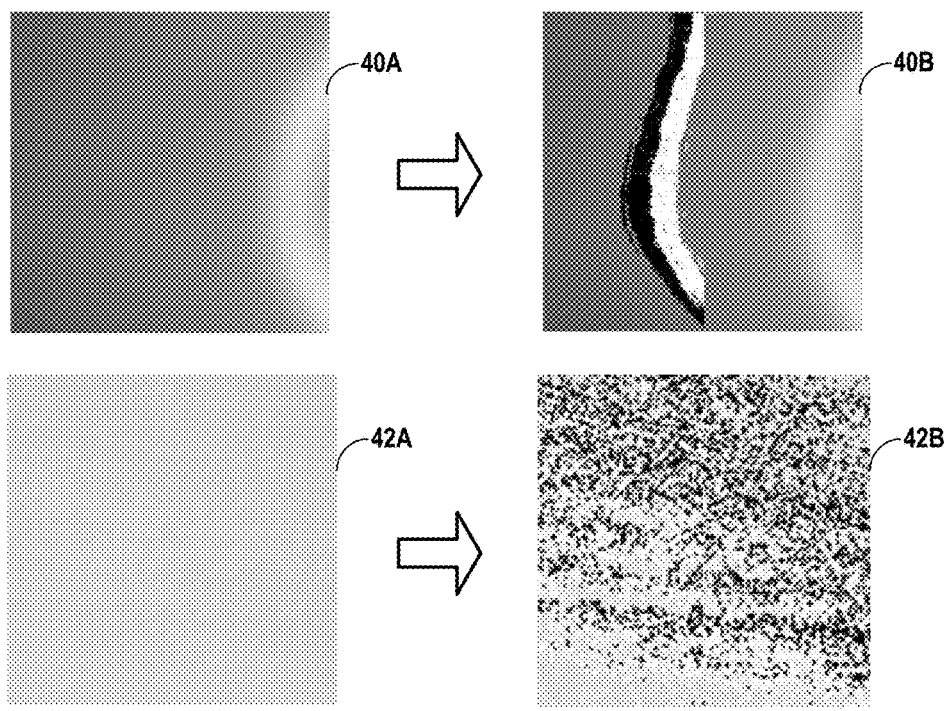
FIG. 5 illustrates distributions of left and right neighborhood pixels for a LUT jump in an image sub-region.

FIG. 5 illustrates distributions of left and right neighborhood pixels for a LUT jump in an image sub-region. To allow for better visualization of the distribution of left and right neighborhood pixels of a LUT jump, left neighborhood pixels of a LUT jump are illustrated in FIG. 5 as black pixels, while right neighborhood pixels of a LUT jump are illustrated in FIG. 5 as white pixels.

As can be seen in FIG. 5, when the black and white pixels are applied to the left and right neighborhood pixels of a LUT jump, the left and right neighborhood pixels of image sub-portion 40 are spatially relatively close next to each other, while the left and right neighborhood pixels of image sub-portion 42 are randomly distributed throughout image sub-portion 42 and are spatially relatively far from each other.

Because the left and right neighborhood pixels of image sub-portion 40 are spatially next to each other, banding artifacts in image sub-portion 40 as a result of the LUT jump may be relatively more visually noticeable. In contrast, because the left and right neighborhood pixels of image sub-portion 42 are randomly distributed throughout image sub-portion 42, so that left and right neighborhood pixels are spatially separated so that they are relatively far from each other, any banding artifacts in sub-portion 42 may be relatively less visually noticeable.

To quantify the spatial separability of the left and right neighborhood pixels of a LUT jump, processing unit 1 may determine a jump crossing rate for each of the one or more LUT jumps within each sub-region of a plurality of sub-regions of the image. A jump crossing rate for a LUT jump may correspond to the spatial separability of the left and right neighborhood pixels of the LUT jump. When the left and right neighborhood pixels are weakly separated (i.e., high interleaving), such as in image sub-portion 40, the number of jump crossing may be relatively high. On the contrary, when there is strong spatial separation between left and right neighborhood pixels, such as in image sub-portion 42, the number of jump crossings may be relatively low.

A sub-region of an image may include a LUT jump if it includes one or more pixels having a pixel value associated with the LUT jump. A pixel value associated with the LUT jump may be an output pixel value having a slope or size greater than one, as described above. Processing unit 1 may, for each LUT jump in a sub-region of the image, determine the jump crossing rate of the LUT jump in the sub-region. Processing unit 1 may identify the sub-region as having artifacts based at least in part on determining the jump crossing rate in the sub-region for each of the LUT jumps in the sub-region.

Figure 6:
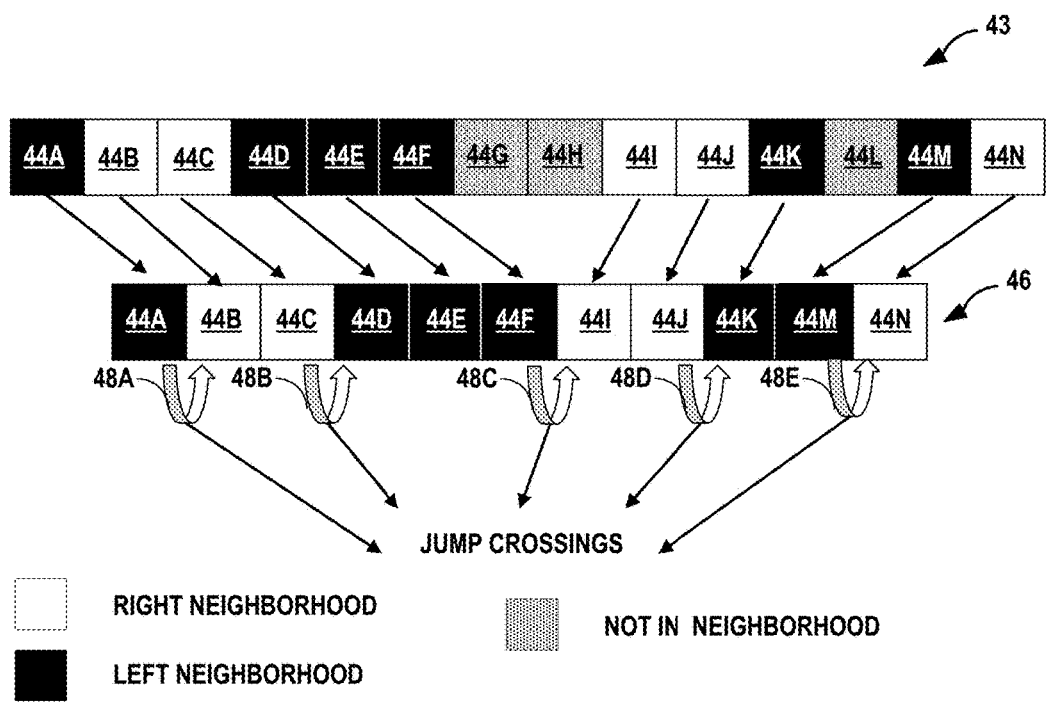
FIG. 6 illustrates an example technique for determining the jump crossing rate of a LUT jump for a line of pixels.

FIG. 6 illustrates an example technique for determining the jump crossing rate of a LUT jump for a line of pixels. A jump crossing rate may be determined line-by-line in raster scan order. By determining the jump crossing rate line-by-line in raster scan order, the techniques disclosed herein may support hardware implementations in which the image is processed in raster scan order, such that processing unit 1 may have limited access to all of the neighboring pixels of a LUT jump.

For each line of pixels of a sub-region of an image, the jump crossing rate for a LUT jump in the line of pixels may be the number of times a pixel belonging to the left neighborhood pixels of the LUT jump jumps to a pixel belonging to the right neighborhood pixels of the LUT jump, and the number of times a pixel belonging to the right neighborhood pixels of the LUT jump jumps to a pixel belonging to the left neighborhood pixels of the LUT jump, ignoring pixels that are not belong to the left or right neighborhood pixels of the LUT jump.

A pixel of a sub-region of an image may belong to the left neighborhood pixels of the LUT jump if it has a pixel value that is in the left neighborhood pixels of the LUT jump. Similarly, a pixel of a sub-region of an image may belong to the right neighborhood pixels of the LUT jump if it has a pixel value that is in the right neighborhood pixels of the LUT jump. A pixel may not belong to the left or right neighborhood pixels of the LUT jump if it has a pixel value that is not in the left or right neighborhood pixels of the LUT jump.

As shown in FIG. 6, line of pixels 43 may include pixels 44A-44N ("pixels 44"). Pixels 44 may include pixels 44A, 44D, 44E, 44F, 44K, and 44M that belong to the left neighborhood pixels of a LUT jump. Pixels 44 may also include pixels 44B, 44C, 44I, 44J, and 44 N that belong to the right neighborhood pixels of the LUT jump. Pixels 44 may also include pixels 44G, 44H, and 44L that do not belong to either the left or right neighborhood pixels of the LUT jump.

Processing unit 1 may ignore pixels 44G, 44H, and 44L that do not belong to either the left or right neighborhood pixels of the LUT jump when determining the jump crossing rate. Thus, when determining the jump crossing rate, processing unit 1 may consider pixel 44F to be next to pixel 44I, and pixel 44M to be next to pixel 44N, such as shown in line of pixels 46.

As shown by line of pixels 46 in which pixels 44G, 44H, and 44L that do not belong to either the left or right neighborhood pixels of the LUT jump are ignored, there is jump crossing 48A from pixel 44A belonging to the left neighborhood of pixels of the LUT jump to pixel 44B belonging to the right neighborhood of pixels of the LUT jump, jump crossing 48B from pixel 44C belonging to the right neighborhood of pixels of the LUT jump to pixel 44D belonging to the left neighborhood of pixels of the LUT jump, jump crossing 48C from pixel 44F belonging to the left neighborhood of pixels of the LUT jump to pixel 44I belonging to the right neighborhood of pixels of the LUT jump, jump crossing 48D from pixel 44J belonging to the right neighborhood of pixels of the LUT jump to pixel 44K belonging to the left neighborhood of pixels of the LUT jump, and jump crossing 48E from pixel 44M belonging to the left neighborhood of pixels of the LUT jump to pixel 44N belonging to the right neighborhood of pixels of the LUT jump. Thus, in the example of FIG. 6, the number of jump crossings for the LUT in line of pixels 43 is 5.

Processing unit 1 may determine the total number of jump crossings for an LUT jump in an image sub-region by determining the number of jump crossings for each line of pixels in the sub-region according to the techniques disclosed herein, and adding up the number of jump crossings for each line of pixels in the sub-region. If the image sub-region contains more than one LUT jump, processing unit 1 may perform the techniques disclosed herein for each LUT jump in the image sub-region to determine the total number of jump crossings for each LUT jump in the image sub-region.

The total number of jump crossings in a sub-region (e.g., block) B for an LUT jump J is denoted by $Q_J(B)$. Jump crossing rate $JCR_J(B)$ for jump J in sub-region B is the normalization of jump crossing and is defined as:

$$JCR_J(B) = \frac{Q_J(B)}{2 \times N_J(B)}, \quad (2)$$

where $$N_J(B) = \min \left\{ \begin{array}{c} \text{number of pixels in the left neighborhood of} \\ \text{the } LUT \text{ jump,} \\ \text{number of pixels in the right neighborhood of} \\ \text{the } LUT \text{ jump} \end{array} \right\}.$$

In other words, processing unit 1 may determine the JCR for a LUT in a sub-region of an image by dividing the number of jump crossings for the LUT in the sub-region by the lesser (e.g., minimum) of the number of pixels in the sub-region that belongs to the set of left neighborhood pixels for the respective LUT jump and the number of pixels in the respective sub-region that belongs to the set of right neighborhood pixels for the respective LUT jump.

Processing unit 1 may determine the jump crossing rate for each of the LUT jumps in the sub-region of the image as part of performing techniques to identify one or more sub-regions of an image that contains artifacts. In particular, processing unit 1 may determine a LUT artifact metric for each of the LUT jumps in the sub-region based on its JCR, and may determine a sub-region artifact metric for the sub-region based at least in part on the LUT artifact metrics for each of the LUT jumps in the sub-region.

Figure 7:
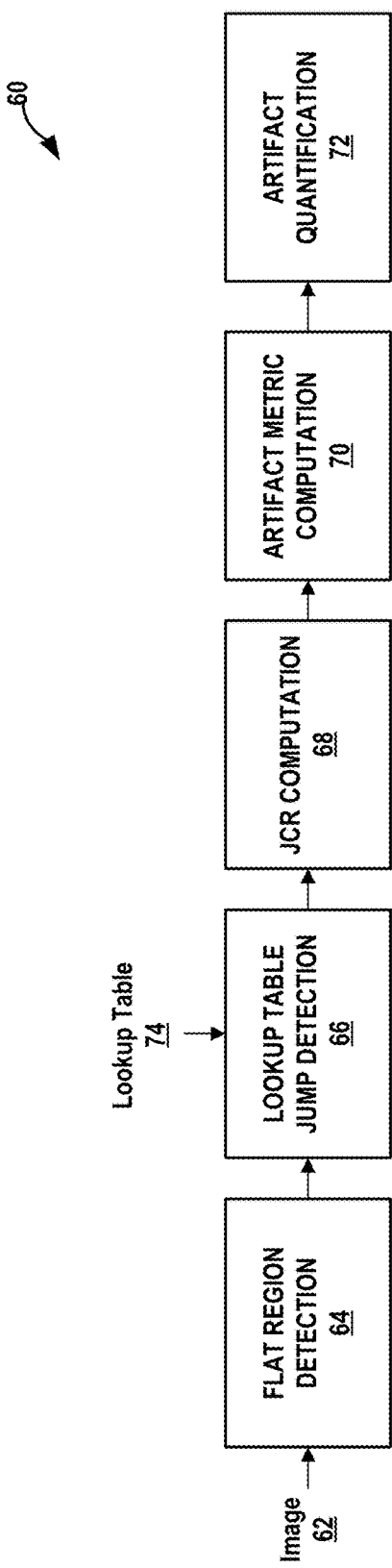
FIG. 7 is a block diagram illustrating an artifact identification pipeline for identifying one or more sub-regions of an image that contains artifacts.

FIG. 7 is a block diagram illustrating an artifact identification pipeline for identifying one or more sub-regions of an image that contains artifacts. As shown in FIG. 7, processing unit 1 may perform artifact identification pipeline 60 to identify one or more sub-regions of image 62 that contains artifacts. As part of performing artifact identification pipeline 60, processing unit 1 may perform flat region detection 64, lookup table (LUT) jump detection 66, jump crossing rate (JCR) computation 68, artifact metric computation 70, and artifact metric quantification 72.

Processing unit 1 may perform flat region detection 64 to identify one or more sub-regions of image 62 (e.g., one or more blocks of image 62) that are flat regions (or flat blocks if sub-regions of image 62 are blocks). Flat regions, also referred to as flat-sub-regions, in an image are defined as sub-regions of the image with smooth/gradual color gradients. Banding artifacts produced as a result of an LUT jump may be relatively more perceivable in flat regions than in textured blocks. This may be because, in a flat region, banding artifacts caused by an LUT jump is not polluted by any texture and thus is more easily visually noticeable. Hence, processing unit 1 may carry out detection of banding artifacts in flat regions of image 62. Non-flat regions, therefore, are not further analyzed by processing unit 1 to determine whether such non-flat regions may contain artifacts.

Processing unit 1 may divide image 62 into sub-regions and may analyze each sub-region of image 62 to determine whether it is a flat region. To divide image 62 into sub-regions, processing unit may divide image 62 into equal sized blocks of pixels, and each block may equate a sub-region of image 62. A block may be a set of pixels of image 62. For example, a block may comprise a 128×128 block of pixels in image 62.

Processing unit 1 may define a flat region metric $M_B$ for a block B as a difference between a maximum pixel value and a minimum output pixel value in each of the one or more flat region, as follows:

$M_B$=Max pixel value in $B$−Min pixel value in $B$, where Max pixel value in B is the maximum output pixel value in block B of image 62, and where Min pixel value in B is the minimum output pixel value in block B of image 62.

Flat regions are characterized by low values of $M_B$ and non-flat regions which have high texture are characterized by high values of $M_B$. Thus, processing unit 1 may compare $M_B$ with a threshold to determine whether the corresponding block of image 62 is a flat region. Specifically, processing unit 1 may determine that a block B is a flat region if its flat region metric $M_B$ is less than a threshold $\tau_1$. Threshold $\tau_1$ may be an integer value, such as 10, and may be set by processing unit 1.

Processing unit 1 may identify one or more sub-regions of image 62 as each being a flat region. Processing unit 1 may further analyze the identified one or more sub-regions of image 62 to determine whether those one or more sub-regions contain artifacts. Processing unit 1 may perform LUT jump detection 66 for each of the identified one or more sub-regions of image 62 to determine whether each of the one or more sub-regions of image 62 contains one or more LUT jumps.

As discussed above while describing FIGS. 2-4, a sub-region (e.g., block) of image 62 may include an LUT jump if a pixel in the sub-region of image 62 has an output color value associated with the LUT jump. In addition, a sub-region of image 62 may include multiple LUT jumps. Processing unit 1 may therefore determine, for each sub-region of the identified one or more sub-regions of image 62, the number of LUT jumps included in the sub-region, and may discard any sub-regions that do not include a LUT jump by refraining from further processing artifact identification pipeline 60 for those sub-regions.

Processing unit 1 may perform JCR computation 68 on the remaining one or more sub-regions of image 62 that include at least one LUT jump to determine a JCR for one or more LUT jumps each of the one or more sub-regions of image 62. For a sub-region, processing unit 1 may perform the JCR computation for each LUT jump in the sub-region according to the techniques described with respect to FIG. 6.

The LUT jumps in a sub-region may be denoted as $\{J_1, J_2, J_3, \ldots, J_M\}$. For each LUT jumps $J_i$ in the current sub-region, processing unit 1 may compute an LUT artifact metric $\theta_{J_i}(B)$ as $$\theta_{J_i}(B) = \frac{S(J_i)^a}{JCR_{J_i}^b}, \quad (3)$$

where $S(J_i)$ is the size (i.e., slope) of the LUT jump $J_i$ as computed in (1), and where $JCR_{J_i}$ is the jump crossing rate for LUT jump $J_i$. a and b are geometric weightings of the size of the LUT jump $J_i$ and the jump crossing rate for the LUT jump $J_i$, respectively.

Banding artifacts may directly relate to the size $S(J_i)$ of LUT jump $J_i$, because it may increase as $S(J_i)$ increases. On the contrary, banding artifacts may inversely relate to jump crossing rate $JCR_{J_i}$, because it may decrease as $JCR_{J_i}$ increases. Thus, the geometric weighting a for $S(J_i)$ may be higher than the geometric weighting b for jump crossing rate $JCR_{J_i}$ because large jumps in LUT are more easily perceivable as artifacts in image 62 irrespective of the spatial distribution of the left and right neighborhood pixels of the LUT jump $J_i$.

Processing unit 1 may determine an LUT artifact metric $\theta_{J_i}(B)$ for each of the one or more LUT jumps $\{J_1, J_2, J_3, \ldots, J_M\}$ in a sub-region to determine a respective set of one or more LUT artifact metrics $\theta_{J_1}(B), \theta_{J_2}(B), \ldots, \theta_{J_M}(B)$ in the sub-region. Processing unit 1 may perform artifact metric computation 70 for each of the one or more sub-regions by determining a set of one or more LUT artifact metrics $\theta_{J_1}(B), \theta_{J_2}(B), \ldots, \theta_{J_M}(B)$ for each of the one or more sub-regions.

In particular, processing unit 1 may determine a sub-region artifact metric $\varphi(B)$ for a sub-region based in part on the one or more LUT artifact metrics $\theta_{J_1}(B), \theta_{J_2}(B), \ldots, \theta_{J_M}(B)$ for LUT jumps in the sub-region by choosing the strongest (e.g., largest) LUT artifact metric as $\varphi(B) = \max\{\theta_{J_1}(B), \theta_{J_2}(B), \ldots, \theta_{J_M}(B)\}$, so that processing unit 1 may choose the largest LUT artifact metric $\theta_{J_i}(B)$ in the sub-region as the sub-region artifact metric $\varphi(B)$. Processing unit 1 may compare the sub-region artifact metric $\varphi(B)$ for the sub-region with a threshold $\tau_2$ to determine whether the sub-region includes one or more artifacts. If the sub-region artifact metric $\varphi(B)$ for the sub-region is larger than threshold $\tau_2$, then processing unit 1 may identify the sub-region as a sub-region of image 62 that contains one or more artifacts. One example value for threshold $\tau_2$ may be 1000, although any other suitable threshold $\tau_2$ may be chosen, for example, to adjust the amount or severity of artifacting in the sub-region needed for the sub-region to be identified as containing one or more artifacts.

Processing unit 1 may threshold and/or analyze a sub-region's artifact metric, $\varphi(B)$ in different ways to suit various requirements. For example, a sensitive banding detector may be designed to declare an image as banded even if a small set of blocks contain strong banding artifacts (very high $\varphi(B)$). The thresholding schemes vary in such scenarios.

Processing unit 1 may perform artifact metric quantification 72 on image 62 to determine whether image 62 is deemed to include one or more artifacts. In some examples, processing unit 1 may deem image 62 to not include artifacts even if processing unit 1 identifies one or more sub-regions of image 62 as including artifacts.

Processing unit 1 determines whether image 62 is deemed to include artifacts based at least in part on the sub-region artifact metric $\varphi(B)$ computed for each of the one or more regions that were determined by processing unit 1 to be a flat region as follows:

$$\Psi(I) = \frac{\text{Number of blocks for which } \{\varphi(B) > \tau_2\}}{\text{Number of flat blocks in the image}},$$

where $\tau_2$ is a threshold as described above.

In other words, processing unit 1 may determine the image artifact metric $\psi(I)$ for an image J (e.g., image 62) by dividing the number of sub-regions of the image that contains banding artifacts, as determined by comparing the artifact metric $\varphi(B)$ for the sub-region with threshold $\tau_2$, with the number of flat regions in image I. Processing unit 1 may determine whether image 62 is deemed to include artifacts by comparing the image artifact metric $\psi(I)$ with a threshold $\tau_3$, and determining that image 62 includes artifacts if its image artifact metric $\psi(I)$ is larger than $\tau_3$. One example value for threshold $\tau_3$ may be 0.5, although any other suitable threshold $\tau_3$ may be chosen, for example, to adjust the amount or severity of artifacting in image 62 for it to be identified as containing one or more artifacts.

By determining the artifact metric $\psi(I)$ for image 62, and determining that image 62 includes artifacts if its artifact metric $\psi(I)$ is larger than $\tau_3$, processing unit 1 may determine whether image 62 contains artifacts by performing artifact identification pipeline 60. If processing unit 1 determines that image 62 contains artifacts as a result of performing artifact identification pipeline 60, processing unit 1 may perform one or more image processing technique to remove or reduce artifacts in image 62.

Because processing unit 1 is able to identify one or more sub-regions of image 62 that includes banding artifacts. Processing unit 1 may be able to selectively perform additional one or more image processing operations, such as dithering operations, on the identified one or more sub-regions of image 62 to reduce, eliminate, or otherwise correct the banding artifacts in the identified one or more sub-regions of image 62.

By selectively performing the additional one or more image processing operations, such as dithering operations, on the identified one or more sub-regions of image 62, processing unit 1 may refrain from performing the additional one or more image processing operations on sub-regions of image 62 that processing unit 1 does not identify as including banding artifacts. Refraining from performing the additional one or more image processing operations on sub-regions of image 62 that processing unit 1 does not identify as including banding artifacts may increase the image quality of those sub-regions of image 62 because applying dithering to sub-regions of image 62 that do not include banding artifacts may decrease the image quality of those sub-regions of image 62.

Thus, determining artifact metric $\psi(I)$ for an image may potentially further improve the performance of computing device 2 and processing unit 1 by refraining from performing one or more image processing technique to remove or reduce artifacts on images if they have artifact metrics $\psi(I)$ less than threshold $\tau_3$, even if processing unit 1 determines that the images include sub-regions that do include artifacts.

Further, processing unit 1 may also determine the severity of the artifacting in a sub-region based on its sub-region artifact metric. Thus, processing unit 1 may be able to better determine the appropriate amount or level of artifact correction to perform on a sub-region that processing unit 1 identifies as having a banding artifact based at least in part on the sub-region's sub-region artifact metric.

For example, The level of artifact correction that processing unit 1 may perform on a sub-region may directly correspond to the sub-region's sub-region artifact metric. For example, the greater the sub-region's sub-region artifact metric, the greater the level of artifact correction that processing unit 1 may perform on the sub-region to correct or reduce banding artifacts in the subregion.

For each of one or more sub-regions of image 62 having an associated sub-region artifact metric that is greater than threshold value $\tau_2$, processing unit 1 may determine a level of artifact reduction for each of the one or more sub-regions based at least in part on the sub-region artifact metric associated with each of the one or more sub-regions. Processing unit 1 may perform one or more artifact reduction operations (e.g., dithering) for each of the one or more sub-regions of image 62 having an associated sub-region artifact metric that is greater than threshold value $\tau_2$ at the determined level of artifact reduction for each of the one or more sub-regions.

In addition, processing unit 1 may, by determining the one or more sub-regions of a current image that includes banding artifacts, enable itself to reduce banding artifacts in images that it encounters in the future. For example, if processing unit 1 encounters a video frame of a video, processing unit 1 may be able to reduce banding artifacts in a successive video frame that have been contrast enhanced based at least in part on determining the one or more sub-regions of the video frame that includes banding artifacts. Specifically, processing unit 1 may exploit the temporal redundancy of pixels in the same locations in two successive video frames to predict whether a sub-region in a successive video frame contains artifacts based at least in part on whether the same sub-region in a previous video frame contains artifacts.

Figure 8:
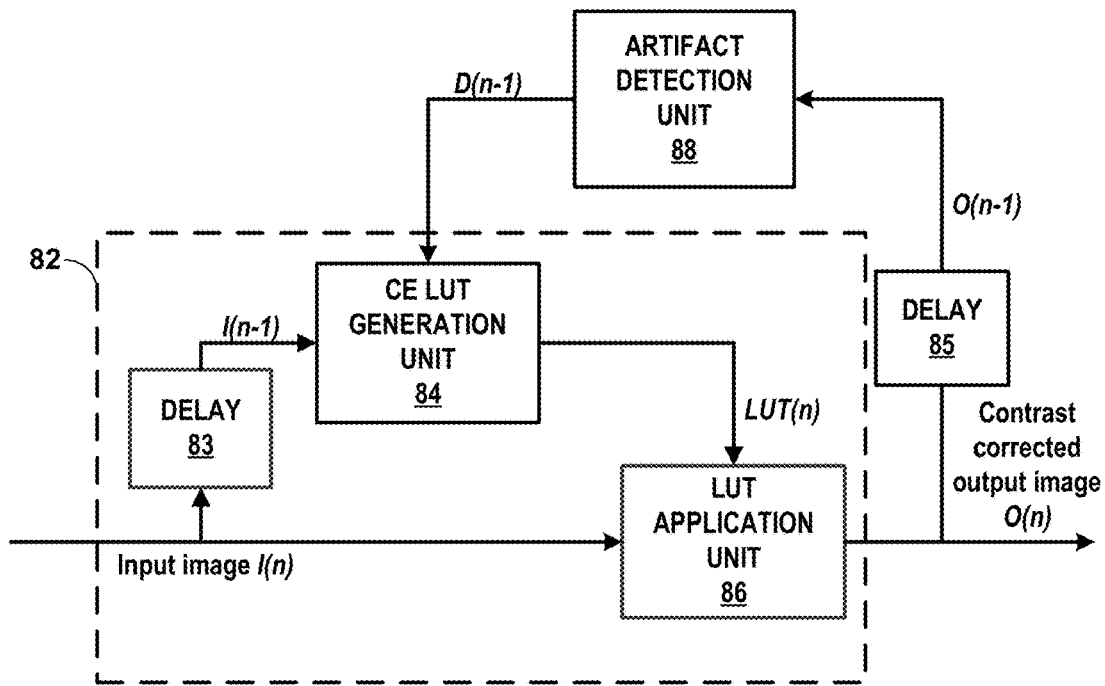
FIG. 8 is a block diagram illustrating how the processing unit may be able to control the image processing of successive images based on determining one or more sub-regions of a current image that includes artifacts.

FIG. 8 is a block diagram illustrating how the processing unit may be able to control the image processing of successive images based on determining one or more sub-regions of a current image that includes artifacts.

As shown in FIG. 8, contrast enhancement unit 82 may be configured to perform LUT-based contrast enhancement on an input image I(n) to generate contrast corrected output image O(n), where n may denote that the image is the n-th video frame of a video. Contrast enhancement unit 82 may include delay 83, contrast enhancement (CE) LUT generation unit 84, and LUT application unit 86.

CE LUT generation unit 84 may be configured to generate a LUT, denoted as LUT(n), for input image I(n), and LUT application unit 86 may be configured to generate contrast corrected output image O(n) from input image I(n) based at least in part on LUT(n) generated by CE LUT generation unit 84.

In FIG. 8, delay 83 in contrast enhancement unit 82 illustrates that CE LUT generation unit 84 is configured to generate LUT(n) for input image I(n) based at least in part on the immediately prior input image I(n−1), where immediately prior input image I(n−1) is the n−1th video frame in the video.

LUT application unit 86 may be configured to receive input image I(n) and LUT(n), and may be further configured to perform LUT-based contrast enhancement on image I(n) using LUT(n) to generate contrast corrected output image O(n).

Artifact detection unit 88 may be configured to receive a contrast corrected output image, such as generated by contrast enhancement unit 82, and to output an indication of one or more sub-regions of the contrast corrected output image that includes banding artifacts, according to the techniques disclosed herein throughout FIGS. 1-7. For example, artifact detection unit 88 may perform one or more aspects of artifact identification pipeline 60 to output an indication of one or more sub-regions of the contrast corrected output image that includes banding artifacts.

Delay 85 illustrates that artifact detection unit 88 is configured to receive an immediately prior contrast corrected output image O(n−1) and to generate an indication D(n−1) of one or more sub-regions of an immediately prior contrast corrected output image O(n−1) that includes banding artifacts.

CE LUT generation unit 84 is configured to receive from artifact detection unit 88 the indication D(n−1) of one or more sub-regions of an immediately prior contrast corrected output image O(n−1) that includes one or more banding artifacts. Because CE LUT generation unit 84 is configured to receive both an indication of one or more sub-regions of an immediately prior contrast corrected output image O(n−1) and immediately prior input image I(n−1), CE LUT generation unit 84 may be configured to determine the LUT(n) for input image I(n) based at least in part on the indication of one or more sub-regions of an immediately prior contrast corrected output image O(n−1) and the immediately prior input image I(n−1).

In other words, CE LUT generation unit 84 may determine the LUT for a current input video frame of a video based at least in part on both the immediately prior input video frame and an indication of one or more sub-regions of the contrast corrected immediately prior output video frame. In this way, if LUT jumps cause banding artifacts to occur in the immediately prior contrast corrected output image, CE LUT generation unit 84 may generate a LUT for the current input video frame that reduces the occurrence of possible banding artifacts when a LUT is applied to the current input video frame.

CE LUT generation unit 84 may determine one or more LUT jumps that occur within the one or more sub-regions of the immediately prior contrast corrected output image O(n−1) that includes one or more banding artifacts. CE LUT generation unit 84 may, when generating the LUT for the current input image, eliminate the one or more LUT jumps or may reduce the size of the LUT jumps to reduce the occurrence of possible banding artifacts when a LUT is applied to the current input video frame.

As discussed above, an LUT jump occurs when the difference between the corresponding output pixel values of two consecutive input pixel values is greater than 1. Thus, CE LUT generation unit 84 may eliminate an LUT jump by setting the corresponding output pixel value of the LUT jump having an associated input pixel value of x to be one greater the output pixel value of the immediately prior input pixel value x−1. Similarly, CE LUT generation unit 84 may reduce an LUT jump by decreasing the corresponding output pixel value of the LUT jump, so that the difference between the corresponding output pixel value of the LUT jump having an associated input pixel value of x and the output pixel value of the immediately prior input pixel value x−1 is greater than one.

In some examples, CE LUT generation unit 84 may generate multiple (i.e., two or more) LUTs so LUT application unit 86 may apply different LUTs for different sub-regions of the current input image to generate the contrast corrected output image. In other words, CE LUT generation unit 84 may generate a custom LUT for a sub-region of the current input image to eliminate one or more LUT jumps within the sub-region if the corresponding sub-region of the immediately prior contrast corrected output image has been identified as containing banding artifacts.

For example, CE LUT generation unit 84 may generate an LUT that eliminates or reduces LUT jumps in the one or more sub-regions of the contrast corrected immediately prior output video frame, so that LUT application unit 86 may apply the LUT to the corresponding one or more sub-regions of the current input image. Meanwhile, CE LUT generation unit 84 may generate an LUT without eliminating or reducing LUT jumps, and LUT application unit 86 may apply the generated LUT to the sub-regions of the current input image that do not correspond to the one or more sub-regions of the contrast corrected immediately prior output video frame. In this way, CE LUT generation unit 84 may generate a LUT for the current input video frame that reduces the occurrence of possible banding artifacts when a LUT is applied to the current input video frame.

Another way to describe artifact detection unit 88 is that it may be configured to output an indication of one or more sub-regions of a current contrast corrected output image O(m) that includes banding artifacts, and CE LUT generation unit 84 may be configured to determine the lookup table LUT(m+1) for an immediately successive input image I(m+1) based at least in part on the indication of one or more sub-regions of a current contrast corrected output image O(m) as well as the current input image I(m)

In other words, artifact detection unit 88 may determine the lookup table that LUT application unit 86 may use to perform contrast enhancement on an immediately successive input video frame of the video based at least in part on the current input video frame and an indication of one or more sub-regions of the current contrast corrected output video frame. In this way, processing unit 1 may be able to perform contrast enhancement on a current input image based at least in part on identifying one or more sub-regions of an immediately prior output image that includes banding artifacts.

Figure 9:
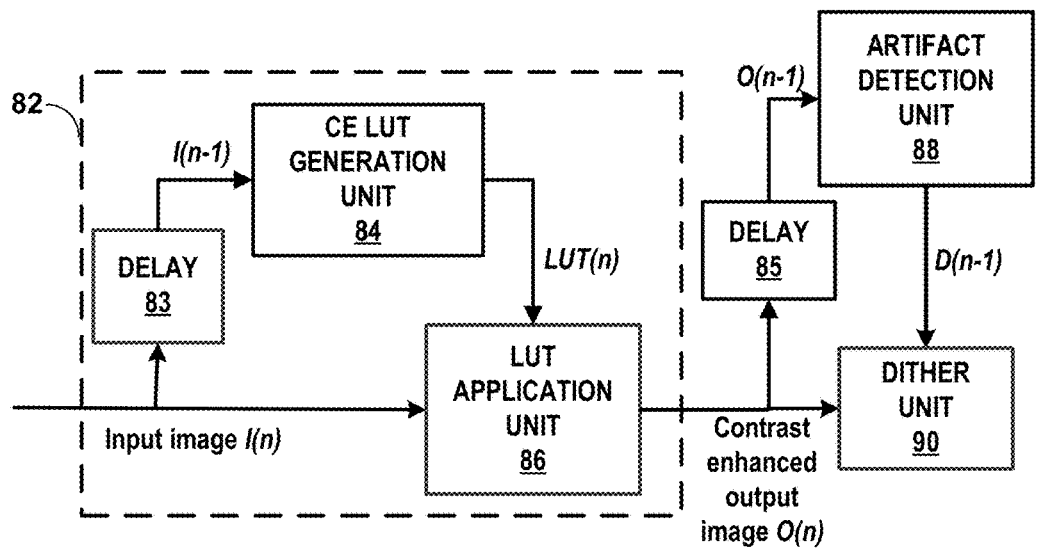
FIG. 9 is a block diagram illustrating how the processing unit may be able to control the artifact reduction of successive images based on determining one or more sub-regions of a current image that includes artifacts.

FIG. 9 is a block diagram illustrating how the processing unit may be able to control the artifact correction of successive images based on determining one or more sub-regions of a current image that includes artifacts.

As shown in FIG. 9, contrast enhancement unit 82 may include delay 83, CE LUT generation unit 84, and LUT application unit 86, as described in FIG. 8, to perform LUT-based contrast enhancement on input image I(n) to generate contrast enhanced output image O(n).

Dither unit 90 may be configured to perform artifact correction on contrast enhanced output image O(n), to reduce or eliminate banding artifacts contained in contrast enhanced output image O(n), based at least in part on an indication D(n−1) of one or more sub-regions of an immediately prior contrast enhanced output image O(n−1) that includes banding artifacts.

Delay 85 illustrates that artifact detection unit 88 is configured to receive an immediately prior contrast corrected output image O(n−1) and to generate an indication D(n−1) of one or more sub-regions of an immediately prior contrast corrected enhanced image O(n−1) that includes banding artifacts. Artifact detection unit 88 may also be configured to generate an indication of the strength of the artifacts in the one or more sub-regions of the immediately prior contrast corrected enhanced image O(n−1) based at least in part on the associated one or more sub-region artifact metrics. Immediately prior contrast corrected output image O(n−1) may be the immediately prior video frame of a video for contrast enhanced output image O(n).

Dither unit 90 may be configured to perform one or more artifact reduction operations on one or more sub-regions of contrast enhanced output image O(n) based at least in part on indication D(n−1) of one or more sub-regions of an immediately prior contrast corrected output image O(n−1) that includes banding artifacts. Due to temporal redundancy, pixels in the same locations in two successive video frames are highly likely to have the same color values. Accordingly, the if a sub-region of a video frame of a video (e.g., video frame n) has banding artifacts, then the corresponding sub-region of the next video frame (e.g., video frame n+1) of the video is highly likely to also have banding artifacts.

A sub-region of a first image may correspond with a sub-region of the second image if each of the sub-regions encompasses the same pixel area in the first and second images. For example, a sub-region that encompasses the set of pixels from (0,0) to (127, 127) of the first image corresponds to a sub-region that encompasses the set of pixels from (0,0) to (127, 127) of the second image.

Artifact detection unit 88 may output the indication of D(n−1) of one or more sub-regions via any suitable fashion. In the example where a sub-region of an image comprises a block, the location of the block within an image may be denoted by the upper-left (x, y) coordinates of the block along with the width and the height (in pixels) of the image. For example, a block that encompasses the set of pixels from (0, 0) to (127, 127) of an image may be denoted as having an upper-left coordinate of (0,0), a width of 128 pixels, and a length of 128 pixels. Thus, artifact detection unit 88 may output an indication of a block by outputting an indication of the upper-left coordinate of the block, the width of the block in pixels, and the height of the block in pixels.

Dither unit 90 may be configured to receive from artifact detection unit 88 an indication of D(n−1) of one or more sub-regions of an immediately prior contrast enhanced output image O(n−1) that includes banding artifacts, and may perform one or more artifact reduction operations, such as dithering, on the corresponding one or more sub-regions of contrast enhanced output image O(n) to ameliorate possible banding artifacts in those one or more sub-regions, without performing such one or more artifact reduction operations on sub-regions of contrast enhanced output image O(n) that do not correspond to the indication of D(n−1) of one or more sub-regions of an immediately prior contrast enhanced output image O(n−1) that includes banding artifacts. In this way, dither unit 90 may perform one or more artifact reduction operations on one or more sub-regions of contrast enhanced output image O(n) based at least in part on the indication D(n−1) of one or more sub-regions of an immediately prior contrast corrected output image O(n−1) that includes banding artifacts.

In addition, dither unit 90 may also be configured to receive from artifact detection unit 88 an indication of the strength of the artifacts in the one or more sub-regions of the immediately prior contrast corrected enhanced image O(n−1) based at least in part on the associated one or more sub-region artifact metrics. Thus, dither unit 90 may customize its artifact reduction operations based on the strength of the artifacts in the one or more sub-regions. For example, dither unit 90 may perform a relatively light artifact reduction operation on a corresponding sub-region of contrast enhanced output image O(n) that artifact detection unit 88 indicates has relatively light artifacts, and may perform a relatively strong artifact reduction operation on a corresponding sub-region of contrast enhanced output image O(n) that artifact detection unit 88 indicates has relatively strong artifacts.

Figure 10:
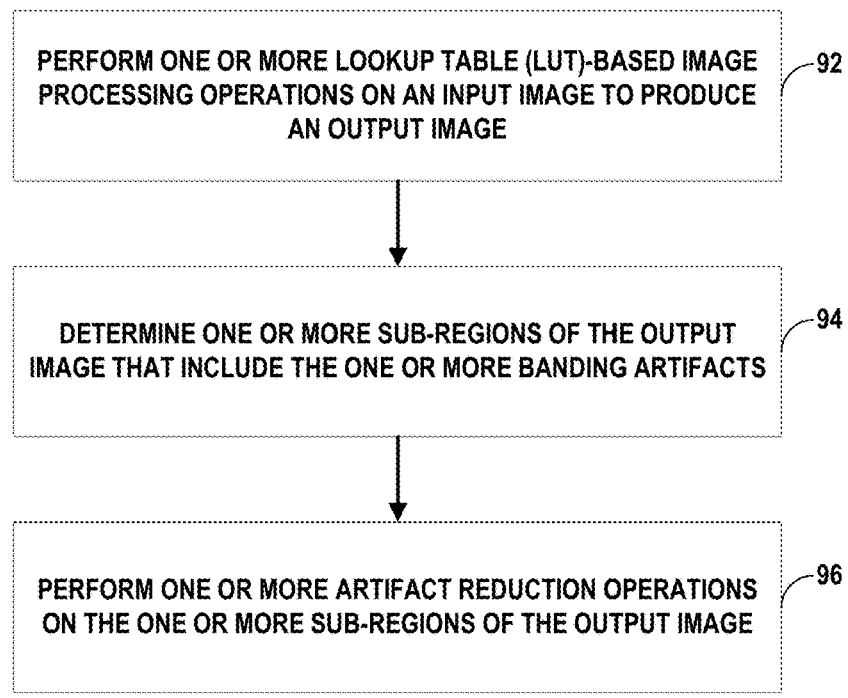
FIG. 10 is a flowchart illustrating example techniques for performing artifact detection.

FIG. 10 is a flowchart illustrating example techniques for performing artifact detection. As shown in FIG. 10, processing unit 1 may perform one or more lookup table (LUT)-based image processing operations on an input image to produce an output image, wherein performing the one or more image processing techniques on the input image introduces one or more banding artifacts in the output image (92). Processing unit 1 may further determine one or more sub-regions of the output image that include the one or more banding artifacts (94). Processing unit 1 may further perform one or more artifact reduction operations on the one or more sub-regions of the output image without performing the one or more artifact reduction operations on remaining sub-portions of the output image (96).

In some examples, performing one or more lookup table (LUT)-based image processing operations on an input image to produce an output image may further include mapping, by the at least one processor, each pixel of the input image from an input pixel value to an output pixel value based at least in part on a LUT, wherein the LUT contains a mapping of input pixel values to output pixel values.

In some examples, processing unit 1 may further determine one or more flat regions in the output image based at least in part on the difference between a maximum output pixel value and a minimum output pixel value in each of the one or more flat regions being less than a first threshold value.

In some examples, processing unit 1 may further determine the one or more sub-regions of the output image that include the one or more banding artifacts out of the one or more flat regions of the output image based at least in part on one or more LUT jumps in each of the one or more sub-regions of the output image.

In some examples, determining the one or more sub-regions of the output image that include the one or more banding artifacts out of the plurality of sub-regions of the output image may further include determining, for each sub-region of the plurality of sub-regions, a jump crossing rate for each of the one or more LUT jumps in the respective sub-region, wherein the jump crossing rate for a respective LUT jump of the one or more LUT jumps corresponds to a spatial separability between a first one or more pixels in the respective sub-region that belongs to a set of left neighborhood pixels for the respective LUT jump and a second one or more pixels in the respective sub-region that belongs to a set of right neighborhood pixels for the respective LUT jump, determine a sub-region artifact metric for the respective sub-region based at least in part on the jump crossing rate for each of the one or more LUT jumps in the respective sub-region, and determining whether to include the respective sub-region in the one or more sub-regions of the output image that include the one or more banding artifacts based at least in part on whether the sub-region artifact metric for the respective sub-region is larger than a second threshold value.

In some examples, determining, for each sub-region of the plurality of sub-regions, a jump crossing rate for each of the one or more LUT jumps in the respective sub-region may further include determining the number of jump crossings for the respective LUT jump as the number of times in the respective sub-region one of the first one or more pixels in the respective sub-region that belongs to the set of left neighborhood pixels for the respective LUT jumps to one of the second one or more pixels in the respective sub-region that belongs to a set of right neighborhood pixels for the respective LUT jump, and vice versa, ignoring pixels that do not belong to either of the left neighborhood of pixels and the right neighborhood of pixel, and determining the jump crossing rate for the respective LUT jump based at least in part on dividing the number of jump crossings for the respective LUT jump by the lesser of the number of pixels in the respective sub-region that belongs to the set of left neighborhood pixels for the respective LUT jump and the number of pixels in the respective sub-region that belongs to the set of right neighborhood pixels for the respective LUT jump.

In some examples, determining the sub-region artifact metric for the respective sub-region based at least in part on the jump crossing rate for each of the one or more LUT jumps in the respective sub-region may further include determining, by the at least one processor, a LUT artifact metric for the respective LUT jump based at least in part on dividing a size of the respective LUT jump by the jump crossing rate for the respective LUT jump, and determining the sub-region artifact metric for the respective sub-region as the largest of one or more LUT artifact metrics for the one or more LUT jumps.

In some examples, processing unit 1 may further determine an image artifact metric for the output image based at least in part on dividing a number of sub-regions of the output image having a respective sub-region artifact metric that is greater than the second threshold value by a number of one or more flat sub-regions in the output image, and determine whether the output image includes banding artifacts based at least in part on comparing the image artifact metric with a second threshold value.

In some examples, processing unit 1 may further perform one or more artifact reduction operations on the one or more sub-portions of the output image without performing the one or more artifact reduction operations on remaining one or more sub-portions of the output image.

In some examples, processing unit 1 may further perform the one or more LUT-based image processing operations on a successive input image to produce a successive output image, wherein performing the one or more LUT-based image processing techniques on the successive input image introduces one or more banding artifacts in the successive output image, and determine a second one or more sub-regions of the successive output image that include the one or more banding artifacts based at least in part on the one or more sub-regions of the output image.

In some examples, processing unit 1 may further perform one or more artifact reduction operations on the second one or more sub-portions of the successive output image without performing the one or more artifact reduction operations on remaining one or more sub-portions of the successive output image.

Figure 11:
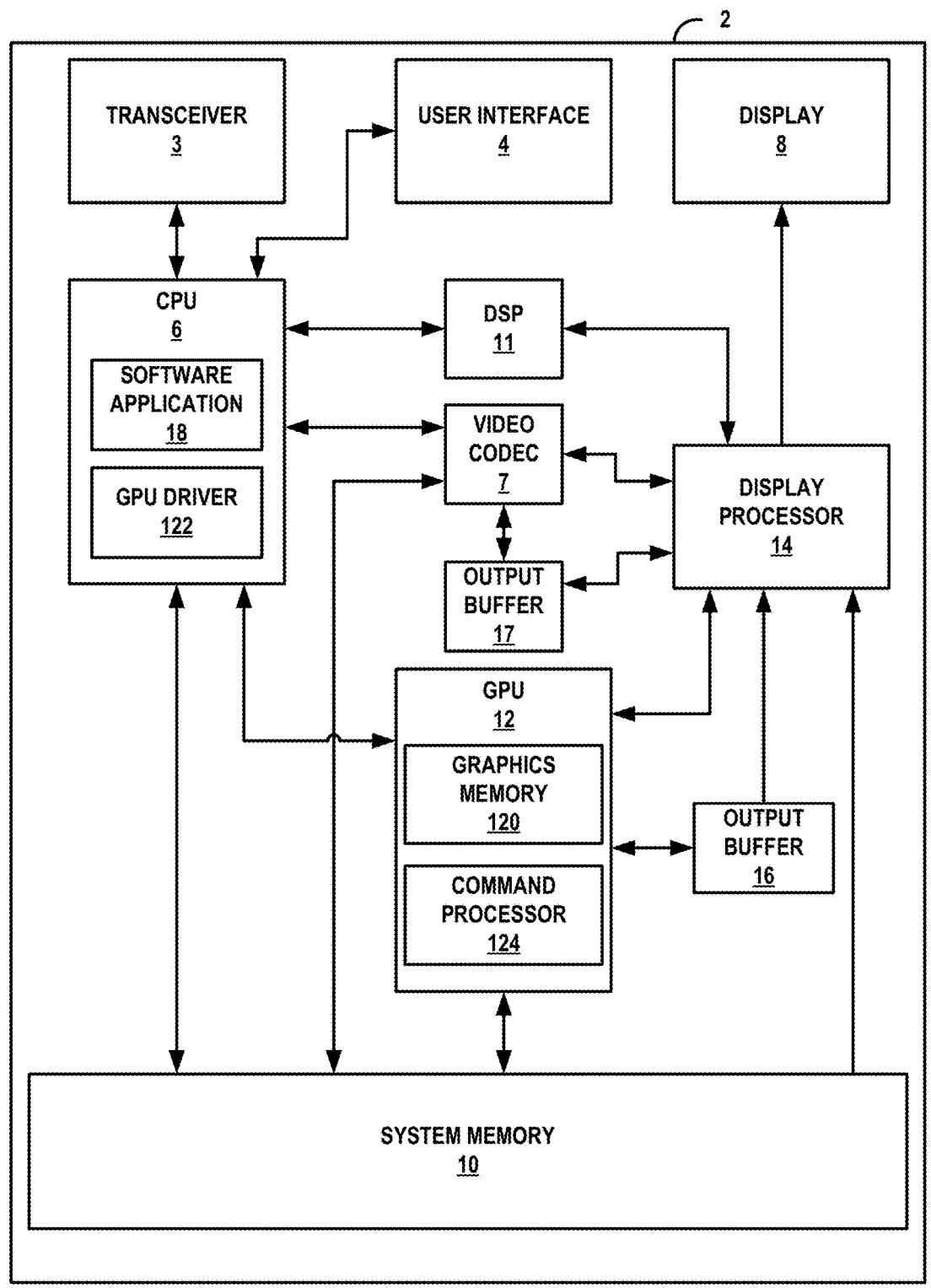
FIG. 11 is a block diagram illustrating an example computing device that may be configured to implement one or more aspects of this disclosure.

FIG. 11 is a block diagram illustrating an example computing device that may be configured to implement one or more aspects of this disclosure. As shown in FIG. 11, computing device 2 may be, for example, a personal computer, a desktop computer, a laptop computer, a tablet computer, a computer workstation, a video game platform or console, a mobile telephone (e.g., a cellular or satellite telephone), a landline telephone, an Internet telephone, a handheld device (e.g., a portable video game device or a personal digital assistant (PDA)), a wearable computing device, a personal music player, a video player, a display (e.g., display device), a television, a television set-top box, a server, an intermediate network device, a mainframe computer, any mobile device, or any other type of device that processes and/or displays graphical data. In the example of FIG. 11, computing device 2 may include central processing unit (CPU) 6, system memory 10, and graphics processing unit (GPU) 12. CPU 6 may be configured to perform image processing in accordance with one or more techniques described herein. GPU 12 may be configured to perform image processing in accordance with one or more techniques described herein.

Computing device 2 may also include display processor 14, transceiver 3, user interface 4, video codec 7, and display 8. In some examples, video codec 7 may be a software application, such as a software application among the one or more software applications 18 configured to be processed by CPU 6 or other components of computing device 2. In other examples, video codec 7 may be a hardware component different from CPU 6, a software application that runs on a component different from CPU 6, or a combination of hardware and software. While the one or more software applications 18 are conceptually shown as inside CPU 6, it is understood that these one or more software applications 18 may be stored in system memory 10, memory external to but accessible to computing device 2, or a combination thereof. The external memory may, for example, be continuously intermittently accessible to computing device 2.

Display processor 14 may be configured to perform image processing in accordance with one or more techniques described herein. Display processor 14 may comprise a pixel processing unit that may implement one or more techniques described herein. Display processor 14 may, for example, utilize a tile-based architecture or a line-based architecture.

In some examples, a tile is an area representation of pixels comprising a height and width with the height being one or more pixels and the width being one or more pixels. In such examples, tiles may be rectangular or square in nature. In other examples, a tile may be a shape different than a square or a rectangle.

Display processor 14 may fetch multiple image layers (e.g., foreground and background) from at least one memory. For example, display processor 14 may fetch image layers from a frame buffer to which a GPU outputs graphical data in the form of pixel representations and/or other memory. As another example, display processor 14 may fetch image layers from on-chip memory of video codec 7, on-chip memory of GPU 12, output buffer 16, output buffer 17, system memory 10, or any other source or memory space. The multiple image layers may include foreground layers and/or background layers.

Display processor 14 may process pixels from multiple layers. Example pixel processing that may be performed by display processor 14 may include up-sampling, down-sampling, scaling, rotation, and other pixel processing. For example, display processor 14 may process pixels associated with foreground image layers and/or background image layers. Display processor 14 may blend pixels from multiple layers, and write back the blended pixels into memory in tile format. Then, the blended pixels may be read from memory in raster format and sent to display 8 for presentment.

Video codec 7 may receive encoded video data. Computing device 2 may receive encoded video data from, for example, a storage medium, a network server, or a source device (e.g., a device that encoded the data or otherwise transmitted the encoded video data to computing device 2, such as a server). In other examples, computing device 2 may itself generate the encoded video data. For example, computing device 2 may include a camera for capturing still images or video. The captured data (e.g., video data) may be encoded by video codec 7. Encoded video data may include a variety of syntax elements generated by a video encoder for use by a video decoder, such as video codec 7, in decoding the video data.

While video codec 7 is described herein as being both a video encoder and video decoder, it is understood that video codec 7 may be a video decoder without encoding functionality in other examples. Video codec 7 may be configured to perform image processing in accordance with one or more techniques described herein. Video data decoded and/or processed by video codec 7 may be sent to any destination. For example, decoded video data may be sent directly to display processor 14, may be sent directly to display 8, or may be sent to memory accessible to display processor 14 or GPU 12 such as system memory 10, output buffer 16, or output buffer 17. In the example shown, video codec 7 is connected to display processor 14, meaning that decoded video data is sent directly to display processor 14 and/or stored in memory accessible to display processor 14. In such an example, display processor 14 may issue one or more memory requests to obtain decoded video data from memory in a similar manner as when issuing one or more memory requests to obtain graphical (still image or video) data from memory (e.g., output buffer 16) associated with GPU 12.

Video codec 7 may operate according to a video compression standard, such as the ITU-T H.264, Advanced Video Coding (AVC), or ITU-T H.265, High Efficiency Video Coding (HEVC), standards. The techniques of this disclosure, however, are not limited to any particular coding standard.

Transceiver 3, video codec 7, and display processor 14 may be part of the same integrated circuit (IC) as CPU 6 and/or GPU 12, may be external to the IC or ICs that include CPU 6 and/or GPU 12, or may be formed in the IC that is external to the IC that includes CPU 6 and/or GPU 12. For example, video codec 7 may be implemented as any of a variety of suitable encoder circuitry, such as one or more microprocessors, digital signal processors (DSPs), application specific integrated circuits (ASICs), field programmable gate arrays (FPGAs), arithmetic logic units (ALUs), discrete logic, software, hardware, firmware or any combinations thereof.

Computing device 2 may include additional modules or processing units not shown in FIG. 11 for purposes of clarity. For example, computing device 2 may include a speaker and a microphone, neither of which are shown in FIG. 11, to effectuate telephonic communications in examples where computing device 2 is a mobile wireless telephone, or a speaker where computing device 2 is a media player. Computing device 2 may also include a camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may be integrated with CPU 6.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications, such as one or more software application 18. The one or more software applications 18 that execute on CPU 6 (or on one or more other components of computing device 2) may include, for example, an operating system, a word processor application, an email application, a spreadsheet application, a media player application, a video game application, a graphical user interface application, or another type of software application that uses graphical data for 2D or 3D graphics. As described herein, processing unit 1 may be, for example, one or more components described with respect to FIG. 11. Accordingly, it is understood, for example, that processing unit 1 may be configured to execute one or software applications (e.g., one or more software application 18). Any description relating to any component of FIG. 11 may equally describe one or more examples of processing unit 1. For example, any combination of CPU 6, GPU 12, DSP 11, a display processor 14 may be a part of processing unit 1.

CPU 6 may be configured to execute GPU driver 122 for controlling the operation of GPU 12. The user may provide input to computing device 2 via one or more input devices (not shown) such as a keyboard, a mouse, a microphone, a touch pad or another input device that is coupled to computing device 2 via user interface 4.

One or more software applications 18 that execute on, for example, CPU 6 may include one or more graphics rendering instructions that instruct CPU 6 to cause the rendering of graphics data to display 8. The instructions may include instructions to process 3D graphics as well as instructions to process 2D graphics. In some examples, the software instructions may conform to a graphics application programming interface (API). Graphics API may be, for example, an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), a parallel computing platform and API model developed by NVIDIA Corporation such as CUDA (i.e., Compute Unified Device Architecture), or any other public or proprietary standard GPU compute API. In order to process the graphics rendering instructions of one or more software applications 18 executing on CPU 6, CPU 6, during execution of one or more software applications 18, may issue one or more graphics rendering commands to GPU 12 (e.g., through GPU driver 122) to cause GPU 12 to perform some or all of the rendering of the graphics data. In some examples, the graphics data to be rendered may include a list of graphics primitives, e.g., points, lines, triangles, quadrilaterals, triangle strips, etc.

One or more software applications 18 may be any application that utilizes any functionality of GPU 12 or that does not utilize any functionality of GPU 12. For example, one or more applications 18 may be any application where execution by CPU 6 causes (or does not cause) one or more commands to be offloaded to GPU 12 for processing. Examples of one or more applications 18 may include an application that causes CPU 6 to offload 3D rendering commands to GPU 12 (e.g., a video game application), an application that causes CPU 6 to offload 2D rendering commands to GPU 12 (e.g., a user interface application), or an application that causes CPU 6 to offload general compute tasks to GPU 12 (e.g., a GPGPU application). As another example, one or more applications 18 may include firmware resident on any component of computing device 2, such as CPU 6, GPU 12, display processor 14, or any other component. Firmware may or may not utilize or invoke the functionality of GPU 12.

One or more software applications 18 may include one or more drawing instructions that instruct GPU 12 to render a graphical user interface (GUI), a graphics scene, graphical data, or other graphics related data. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

One or more software applications 18 may invoke GPU driver 122, via graphics API, to issue one or more commands to GPU 12 for rendering one or more graphics primitives into displayable graphics images. For example, one or more software applications 18 may invoke GPU driver 122, via graphics API, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered.

GPU 12 may be configured to perform graphics operations to render one or more graphics primitives to display 8. Thus, when one or more software applications 18 executing on CPU 6 requires graphics processing, CPU 6 may provide graphics rendering commands along with graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

One or more software applications 18 may invoke GPU driver 122, to issue one or more commands to GPU 12 for rendering one or more graphics primitives into displayable graphics images (e.g., displayable graphical data). For example, one or more software applications 18 may, when executed, invoke GPU driver 122 to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by one or more software applications 18 to GPU driver 122, GPU driver 122 may formulate one or more commands that specify one or more operations for GPU 12 to perform in order to render the primitive. When GPU 12 receives a command from CPU 6, a graphics processing pipeline may execute on shader processors of GPU 12 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to output buffer 16 accessible to display processor 14. In some examples, the graphics processing pipeline may include fixed function logic and/or be executed on programmable shader cores.

Output buffer 16 stores destination pixels for GPU 12. Each destination pixel may be associated with a unique screen pixel location. Similarly, output buffer 17 may store destination pixels for video codec 7 depending on the example. Output buffer 17 may be considered a frame buffer associated with video codec 7. In some examples, output buffer 16 and/or output buffer 17 may store color components and a destination alpha value for each destination pixel. For example, output buffer 16 and/or output buffer 17 may store pixel data according to any format. For example, output buffer 16 and/or output buffer 17 may store Red, Green, Blue, Alpha (RGBA) components for each pixel where the "RGB" components correspond to color values and the "A" component corresponds to a destination alpha value. As another example, output buffer 16 and/or output buffer 17 may store pixel data according to the YCbCr color format, YUV color format, RGB color format, or according to any other color format. Although output buffer 16 and system memory 10 are illustrated as being separate memory units, in other examples, output buffer 16 may be part of system memory 10. For example, output buffer 16 may be allocated memory space in system memory 10. Output buffer 16 may constitute a frame buffer. Further, as discussed above, output buffer 16 may also be able to store any suitable data other than pixels.

Similarly, although output buffer 17 and system memory 10 are illustrated as being separate memory units, in other examples, output buffer 17 may be part of system memory 10. For example, output buffer 17 may be allocated memory space in system memory 10. Output buffer 17 may constitute a video codec buffer or a frame buffer. Further, as discussed above, output buffer 17 may also be able to store any suitable data other than pixels. In some examples, although output buffer 16 and output buffer 17 are illustrated as being separate memory units, output buffer 16 and output buffer 17 may be the same buffer or different parts of the same buffer.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC). GPU 12 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. GPU 12 may also include one or more processor cores, so that GPU 12 may be referred to as a multi-core processor. In some examples, GPU 12 may be specialized hardware that includes integrated and/or discrete logic circuitry that provides GPU 12 with massive parallel processing capabilities suitable for graphics processing. In some instances, GPU 12 may also include general-purpose processing capabilities, and may be referred to as a general-purpose GPU (GPGPU) when implementing general-purpose processing tasks (e.g., so-called "compute" tasks).

In some examples, graphics memory 120 may be part of GPU 12. For example, graphics memory 120 may be on-chip memory or memory that is physically integrated into the integrated circuit chip of GPU 12. If graphics memory 120 is on-chip, GPU 12 may be able to read values from or write values to graphics memory 120 more quickly than reading values from or writing values to system memory 10 via a system bus. Thus, GPU 12 may read data from and write data to graphics memory 120 without using a bus. In other words, GPU 12 may process data locally using a local storage, instead of off-chip memory. Such graphics memory 120 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 120 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and/or output buffer 16 and output values that cause the pixels of display 8 to illuminate to display the image. In some examples, display processor 14 may be configured to perform 2D operations on data to be displayed, including scaling, rotation, blending, and compositing. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device. In some examples, display 8 may be integrated within computing device 2. For instance, display 8 may be a screen of a mobile telephone. In other examples, display 8 may be a stand-alone device coupled to computing device 2 via a wired or wireless communications link. For example, display 8 may be a computer monitor or flat panel display connected to a computing device (e.g., personal computer, mobile computer, tablet, mobile phone, etc.) via a cable or wireless link.

CPU 6 processes instructions for execution within computing device 2. CPU 6 may generate a command stream using a driver (e.g., GPU driver 122 which may be implemented in software executed by CPU 6) for execution by GPU 12. That is, CPU 6 may generate a command stream that defines a set of operations to be performed by GPU 12.

CPU 6 may generate a command stream to be executed by GPU 12 that causes viewable content to be displayed on display 8. For example, CPU 6 may generate a command stream that provides instructions for GPU 12 to render graphics data that may be stored in output buffer 16 for display at display 8. In this example, CPU 6 may generate a command stream that is executed by a graphics rendering pipeline.

Additionally or alternatively, CPU 6 may generate a command stream to be executed by GPU 12 that causes GPU 12 to perform other operations. For example, in some instances, CPU 6 may be a host processor that generates a command stream for using GPU 12 as a general purpose graphics processing unit (GPGPU). In this way, GPU 12 may act as a secondary processor for CPU 6. For example, GPU 12 may carry out a variety of general purpose computing functions traditionally carried out by CPU 6. Examples include a variety of image processing functions, including video decoding and post processing (e.g., de-blocking, noise reduction, color correction, and the like) and other application specific image processing functions (e.g., facial detection/recognition, pattern recognition, wavelet transforms, and the like).

In some examples, GPU 12 may collaborate with CPU 6 to execute such GPGPU applications. For example, CPU 6 may offload certain functions to GPU 12 by providing GPU 12 with a command stream for execution by GPU 12. In this example, CPU 6 may be a host processor and GPU 12 may be a secondary processor. CPU 6 may communicate with GPU 12 to direct GPU 12 to execute GPGPU applications via GPU driver 122.

GPU driver 122 may communicate, to GPU 12, one or more command streams that may be executed by shader units of GPU 12. GPU 12 may include command processor 124 that may receive the one or more command streams from GPU driver 122. Command processor 124 may be any combination of hardware and software configured to receive and process one or more command streams. As such, command processor 124 is a stream processor. In some examples, instead of command processor 124, any other suitable stream processor may be usable in place of command processor 124 to receive and process one or more command streams and to perform the techniques disclosed herein. In one example, command processor 124 may be a hardware processor. In the example shown in FIG. 11, command processor 124 may be included in GPU 12. In other examples, command processor 124 may be a unit that is separate from CPU 6 and GPU 12. Command processor 124 may also be known as a stream processor, command/stream processor, and the like to indicate that it may be any processor configured to receive streams of commands and/or operations.

Command processor 124 may process one or more command streams including scheduling operations included in the one or more command streams for execution by GPU 12. Specifically, command processor 124 may process the one or more command streams and schedule the operations in the one or more command streams for execution by shader units of GPU 12. In operation, GPU driver 122 may send to command processor 124 a command stream comprising a series of operations to be executed by GPU 12. Command processor 124 may receive the stream of operations that comprise the command stream and may process the operations of the command stream sequentially based on the order of the operations in the command stream and may schedule the operations in the command stream for execution by shader processors of shader units of GPU 12.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors.

In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various embodiments of the invention have been described. These and other embodiments are within the scope of the following claims.

What is claimed is:

1. A method comprising:
  performing, by at least one processor, one or more lookup table (LUT)-based image processing operations on an input image to produce an output image, wherein performing the one or more LUT-based image processing operations on the input image introduces one or more banding artifacts in the output image;
  determining, by the at least one processor, one or more sub-regions of the output image that include the one or more banding artifacts;
  performing, by the at least one processor, one or more artifact reduction operations on the one or more sub-regions of the output image without performing the one or more artifact reduction operations on remaining sub-regions of the output image;
  performing, by the at least one processor, the one or more LUT-based image processing operations on a successive input image to produce a successive output image, wherein performing the one or more LUT-based image processing operations on the successive input image introduces a second one or more banding artifacts in the successive output image; and
  determining, by the at least one processor, a second one or more sub-regions of the successive output image that include the second one or more banding artifacts based at least in part on the one or more sub-regions of the output image.

2. The method of claim 1, wherein performing the one or more LUT-based image processing operations on the input image to produce the output image further comprises:
  mapping, by the at least one processor, each pixel of the input image from an input pixel value to an output pixel value based at least in part on a LUT, wherein the LUT contains a mapping of input pixel values to output pixel values.

3. The method of claim 2, further comprising:
  determining, by the at least one processor, one or more flat sub-regions in the output image based at least in part on a difference between a maximum output pixel value in a minimum output pixel value in each of the one or more flat sub-regions being larger than a first threshold value.

4. The method of claim 3, further comprising:
  determining, by the at least one processor, the one or more sub-regions of the output image that include the one or more banding artifacts out of the one or more flat sub-regions of the output image based at least in part on one or more LUT jumps in each of the one or more sub-regions of the output image.

5. The method of claim 4, wherein determining the one or more sub-regions of the output image that include the one or more banding artifacts out of the one or more flat sub-regions of the output image further comprises:
  determining, by the at least one processor for each sub-region of the one or more flat sub-regions, a jump crossing rate for each of the one or more LUT jumps in the respective sub-region, wherein the jump crossing rate for a respective LUT jump of the one or more LUT jumps corresponds to a spatial separability between a first one or more pixels in the respective sub-region that belongs to a set of left neighborhood pixels for the respective LUT jump and a second one or more pixels in the respective sub-region that belongs to a set of right neighborhood pixels for the respective LUT jump; and
  determining, by the at least one processor, a sub-region artifact metric for the respective sub-region based at least in part on the jump crossing rate for each of the one or more LUT jumps in the respective sub-region; and
  determining, by the at least one processor, whether to include the respective sub-region in the one or more sub-regions of the output image that include the one or more banding artifacts based at least in part on whether the sub-region artifact metric for the respective sub-region is larger than a second threshold value.

6. The method of claim 5, wherein determining, for each sub-region of the one or more flat sub-regions, the jump crossing rate for each of the one or more LUT jumps in the respective sub-region further comprises:
  determining, by the at least one processor, a number of jump crossings for the respective LUT jump as a number of times in the respective sub-region one of the first one or more pixels in the respective sub-region that belongs to the set of left neighborhood pixels for the respective LUT jumps to one of the second one or more pixels in the respective sub-region that belongs to a set of right neighborhood pixels for the respective LUT jump, and vice versa, ignoring pixels that do not belong to either of the left neighborhood of pixels and the right neighborhood of pixel; and
  determining, by the at least one processor, the jump crossing rate for the respective LUT jump based at least in part on dividing the number of jump crossings for the respective LUT jump by the lesser of a number of the first one or more pixels in the respective sub-region that belongs to the set of left neighborhood pixels for the respective LUT jump and a number of the second one or more pixels in the respective sub-region that belongs to the set of right neighborhood pixels for the respective LUT jump.

7. The method of claim 5, wherein determining the sub-region artifact metric for the respective sub-region based at least in part on the jump crossing rate for each of the one or more LUT jumps in the respective sub-region further comprises:
  determining, by the at least one processor, a LUT artifact metric for the respective LUT jump based at least in part on dividing a size of the respective LUT jump by the jump crossing rate for the respective LUT jump; and determining, by the at least one processor, the sub-region artifact metric for the respective sub-region as the largest of one or more LUT artifact metrics for the one or more LUT jumps.

8. The method of claim 7, further comprising:
determining, by the at least one processor, an image artifact metric for the output image based at least in part on dividing a number of sub-regions of the output image having a respective sub-region artifact metric that is greater than the second threshold value by a number of one or more flat sub-regions in the output image; and determining, by the at least one processor, whether the output image includes banding artifacts based at least in part on comparing the image artifact metric with the second threshold value.

9. The method of claim 7, wherein performing the one or more artifact reduction operations on the one or more sub-regions of the output image further comprises:
determining a level of artifact reduction for each of the one or more sub-regions of the output image based at least in part on the sub-region artifact metric associated with each of the one or more sub-regions; and performing, by the at least one processor, the one or more artifact reduction operations for each of the one or more sub-regions at the level of artifact reduction for each of the one or more sub-regions.

10. The method of claim 1, further comprising:
performing, by the at least one processor, the one or more artifact reduction operations on the second one or more sub-regions of the successive output image without performing the one or more artifact reduction operations on remaining one or more sub-regions of the successive output image.

11. A computing device comprising:
a memory configured to store an input image; and
at least one processor configured to:
perform one or more lookup table (LUT)-based image processing operations on the input image to produce an output image, wherein performing the one or more LUT-based image processing operations on the input image introduces one or more banding artifacts in the output image;
determine one or more sub-regions of the output image that include the one or more banding artifacts;
perform one or more artifact reduction operations on the one or more sub-regions of the output image without performing the one or more artifact reduction operations on remaining sub-regions of the output image;
perform the one or more LUT-based image processing operations on a successive input image to produce a successive output image, wherein performing the one or more LUT-based image processing operations on the successive input image introduces a second one or more banding artifacts in the successive output image; and
determine a second one or more sub-regions of the successive output image that include the second one or more banding artifacts based at least in part on the one or more sub-regions of the output image.

12. The computing device of claim 11, wherein the at least one processor is further configured to:
map each pixel of the input image from an input pixel value to an output pixel value based at least in part on a LUT, wherein the LUT contains a mapping of input pixel values to output pixel values.

13. The computing device of claim 12, wherein the at least one processor is further configured to:
determine one or more flat sub-regions in the output image based at least in part on a difference between a maximum output pixel value in a minimum output pixel value in each of the one or more flat sub-regions being larger than a first threshold value.

14. The computing device of claim 13, wherein the at least one processor is further configured to:
determine the one or more sub-regions of the output image that include the one or more banding artifacts out of the one or more flat sub-regions of the output image based at least in part on one or more LUT jumps in each of the one or more sub-regions of the output image.

15. The computing device of claim 14, wherein the at least one processor is further configured to:
determine, for each sub-region of the one or more flat sub-regions, a jump crossing rate for each of the one or more LUT jumps in the respective sub-region, wherein the jump crossing rate for a respective LUT jump of the one or more LUT jumps corresponds to a spatial separability between a first one or more pixels in the respective sub-region that belongs to a set of left neighborhood pixels for the respective LUT jump and a second one or more pixels in the respective sub-region that belongs to a set of right neighborhood pixels for the respective LUT jump;
determine a sub-region artifact metric for the respective sub-region based at least in part on the jump crossing rate for each of the one or more LUT jumps in the respective sub-region; and
determine whether to include the respective sub-region in the one or more sub-regions of the output image that include the one or more banding artifacts based at least in part on whether the sub-region artifact metric for the respective sub-region is larger than a second threshold value.

16. The computing device of claim 15, wherein the at least one processor is further configured to:
determine a LUT artifact metric for the respective LUT jump based at least in part on dividing a size of the respective LUT jump by the jump crossing rate for the respective LUT jump; and
determine the sub-region artifact metric for the respective sub-region as the largest of one or more LUT artifact metrics for the one or more LUT jumps.

17. The computing device of claim 16, wherein the at least one processor is further configured to:
determine an image artifact metric for the output image based at least in part on dividing a number of sub-regions of the output image having a respective sub-region artifact metric that is greater than the second threshold value by a number of one or more flat sub-regions in the output image; and
determine whether the output image includes banding artifacts based at least in part on comparing the image artifact metric with a second threshold value.

18. An apparatus comprising:
means for performing one or more lookup table (LUT)-based image processing operations on an input image to produce an output image, wherein performing the one or more LUT-based image processing operations on the input image introduces one or more banding artifacts in the output image;

means for determining one or more sub-regions of the output image that include the one or more banding artifacts;

means for performing one or more artifact reduction operations on the one or more sub-regions of the output image without performing the one or more artifact reduction operations on remaining sub-regions of the output image;

means for performing the one or more LUT-based image processing operations on a successive input image to produce a successive output image, wherein the means for performing the one or more LUT-based image processing operations on the successive input image introduces a second one or more banding artifacts in the successive output image; and means for determining a second one or more sub-regions of the successive output image that include the second one or more banding artifacts based at least in part on the one or more sub-regions of the output image.

19. The apparatus of claim 18, wherein the means for performing the one or more LUT-based image processing operations on the input image to produce the output image further comprises:
means for mapping each pixel of the input image from an input pixel value to an output pixel value based at least in part on a LUT, wherein the LUT contains a mapping of input pixel values to output pixel values.

20. The apparatus of claim 19, further comprising:
means for determining one or more flat sub-regions in the output image based at least in part on a difference between a maximum output pixel value in a minimum output pixel value in each of the one or more flat sub-regions being larger than a first threshold value.

21. The apparatus of claim 20, further comprising:
means for determining the one or more sub-regions of the output image that include the one or more banding artifacts out of the one or more flat sub-regions of the output image based at least in part on one or more LUT jumps in each of the one or more sub-regions of the output image.

22. The apparatus of claim 21, wherein the means for determining the one or more sub-regions of the output image that include the one or more banding artifacts out of the one or more flat sub-regions of the output image further comprises:
means for determining, for each sub-region of the one or more flat sub-regions, a jump crossing rate for each of the one or more LUT jumps in the respective sub-region, wherein the jump crossing rate for a respective LUT jump of the one or more LUT jumps corresponds to a spatial separability between a first one or more pixels in the respective sub-region that belongs to a set of left neighborhood pixels for the respective LUT jump and a second one or more pixels in the respective sub-region that belongs to a set of right neighborhood pixels for the respective LUT jump;
means for determining a sub-region artifact metric for the respective sub-region based at least in part on the jump crossing rate for each of the one or more LUT jumps in the respective sub-region; and
means for determining whether to include the respective sub-region in the one or more sub-regions of the output image that include the one or more banding artifacts based at least in part on whether the sub-region artifact metric for the respective sub-region is larger than a second threshold value.

23. The apparatus of claim 22, wherein the means for determining the sub-region artifact metric for the respective sub-region based at least in part on the jump crossing rate for each of the one or more LUT jumps in the respective sub-region further comprises:
means for determining a LUT artifact metric for the respective LUT jump based at least in part on dividing a size of the respective LUT jump by the jump crossing rate for the respective LUT jump; and
means for determining the sub-region artifact metric for the respective sub-region as the largest of one or more LUT artifact metrics for the one or more LUT jumps.

24. A computer-readable storage medium storing instructions that, when executed, cause at least one processor to:
perform one or more lookup table (LUT)-based image processing operations on an input image to produce an output image, wherein performing the one or more LUT-based image processing operations on the input image introduces one or more banding artifacts in the output image;
determine one or more sub-regions of the output image that include the one or more banding artifacts;
perform one or more artifact reduction operations on the one or more sub-regions of the output image without performing the one or more artifact reduction operations on remaining sub-regions of the output image;
perform the one or more LUT-based image processing operations on a successive input image to produce a successive output image, wherein performing the one or more LUT-based image processing operations on the successive input image introduces a second one or more banding artifacts in the successive output image; and
determine a second one or more sub-regions of the successive output image that include the second one or more banding artifacts based at least in part on the one or more sub-regions of the output image.

25. The computer-readable storage medium of claim 24, wherein instructions further cause the at least one processor to:
map each pixel of the input image from an input pixel value to an output pixel value based at least in part on a LUT, wherein the LUT contains a mapping of input pixel values to output pixel values.

26. The computer-readable storage medium of claim 25, wherein instructions further cause the at least one processor to:
determine one or more flat sub-regions in the output image based at least in part on a difference between a maximum output pixel value in a minimum output pixel value in each of the one or more flat sub-regions being larger than a first threshold value.

27. The computer-readable storage medium of claim 26, wherein instructions further cause the at least one processor to:
determine the one or more sub-regions of the output image that include the one or more banding artifacts out of the one or more flat sub-regions of the output image based at least in part on one or more LUT jumps in each of the one or more sub-regions of the output image.

28. The computer-readable storage medium of claim 27, wherein instructions further cause the at least one processor to:

determine, for each sub-region of the one or more flat sub-regions, a jump crossing rate for each of the one or more LUT jumps in the respective sub-region, wherein the jump crossing rate for a respective LUT jump of the one or more LUT jumps corresponds to a spatial separability between a first one or more pixels in the respective sub-region that belongs to a set of left neighborhood pixels for the respective LUT jump and a second one or more pixels in the respective sub-region that belongs to a set of right neighborhood pixels for the respective LUT jump;

determine a sub-region artifact metric for the respective sub-region based at least in part on the jump crossing rate for each of the one or more LUT jumps in the respective sub-region; and determine whether to include the respective sub-region in the one or more sub-regions of the output image that include the one or more banding artifacts based at least in part on whether the sub-region artifact metric for the respective sub-region is larger than a second threshold value.

29. The computer-readable storage medium of claim 28, wherein instructions further cause the at least one processor to:

determine a LUT artifact metric for the respective LUT jump based at least in part on dividing a size of the respective LUT jump by the jump crossing rate for the respective LUT jump; and determine the sub-region artifact metric for the respective sub-region as the largest of one or more LUT artifact metrics for the one or more LUT jumps.

* * * * *